United States Patent
Woodworth et al.

(10) Patent No.: US 8,951,086 B2
(45) Date of Patent: Feb. 10, 2015

(54) MODULAR MINIATURE UNMANNED AIRCRAFT WITH VECTORED-THRUST CONTROL

(71) Applicant: Aurora Flight Sciences Corporation, Manassas, VA (US)

(72) Inventors: Adam John Woodworth, Melrose, MA (US); James Peverill, Canton, MA (US); Greg Vulikh, Manassas, VA (US); Jeremy Scott Hollman, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 78 days.

(21) Appl. No.: 13/954,218

(22) Filed: Jul. 30, 2013

(65) Prior Publication Data

US 2014/0054423 A1    Feb. 27, 2014

Related U.S. Application Data

(60) Division of application No. 13/567,015, filed on Aug. 4, 2012, now Pat. No. 8,500,067, which is a continuation-in-part of application No. 12/556,225, filed on Sep. 9, 2009, now Pat. No. 8,721,383.

(51) Int. Cl.
*A63H 17/02* (2006.01)
*B64C 1/30* (2006.01)
(Continued)

(52) U.S. Cl.
CPC . *B64C 1/30* (2013.01); *B64D 27/26* (2013.01); *B64D 9/00* (2013.01); *B64C 19/00* (2013.01);
(Continued)

(58) Field of Classification Search
USPC ..... 244/7 R, 7 A, 7 C, 12.4, 17.23, 17.25, 49, 244/51, 56, 108, 110 H, 120, 137.4, 138, 244/140, 190; 446/6, 30–45, 55–68; 16/320; 248/548, 683; 439/38–40, 180; 403/2
See application file for complete search history.

(56) References Cited

U.S. PATENT DOCUMENTS 2,791,867 A    5/1957   Dasher
3,177,612 A    4/1965   Giossi
(Continued)

FOREIGN PATENT DOCUMENTS

DE    102008023194 A1    12/2009
GB         2446589 A      8/2008

OTHER PUBLICATIONS

"Paparazzi User's Manual." École Nationale de l'Aviation Civile. Toulouse, France, Feb. 3, 2008. Accessed online from <http://wiki.paparazziuav.org/w/images/0/0a/Users_manual.pdf> on Sep. 29, 2014.*

(Continued)

*Primary Examiner* — Tien Dinh
*Assistant Examiner* — Michael Kreiner
(74) *Attorney, Agent, or Firm* — Michael Stanley Tomsa; Katten Muchin Rosenman LLP

(57) ABSTRACT

An aircraft for unmanned aviation is described. The aircraft includes an airframe, a pair of fins attached to a rear portion of the airframe, a pair of dihedral braces attached to a bottom portion of the airframe, a first thrust-vectoring ("T/V") module and a second T/V module, and an electronics module. The electronics module provides commands to the two T/V modules. The two T/V modules are configured to provide lateral and longitudinal control to the aircraft by directly controlling a thrust vector for each of the pitch, the roll, and the yaw of the aircraft. The use of directly articulated electrical motors as T/V modules enables the aircraft to execute tight-radius turns over a wide range of airspeeds.

20 Claims, 31 Drawing Sheets

(51) Int. Cl.
*B64D 27/26* (2006.01)
*B64D 9/00* (2006.01)
*B64C 19/00* (2006.01)
*B64C 15/00* (2006.01)
*B64C 39/02* (2006.01)
*A63H 27/00* (2006.01)

(52) U.S. Cl.
CPC ............... *B64C 15/00* (2013.01); *B64C 39/028* (2013.01); *A63H 27/001* (2013.01); *A63H 27/02* (2013.01); *B64C 2201/028* (2013.01); *B64C 2201/042* (2013.01); *B64C 2201/127* (2013.01); *B64C 2201/201* (2013.01); *B64C 2201/187* (2013.01); *B64C 2201/104* (2013.01); *B64C 2201/165* (2013.01)
USPC ............................. 446/6; 244/12.4; 244/190

(56) References Cited

U.S. PATENT DOCUMENTS

| | | | |
|---|---|---|---|
| 3,777,395 A | 12/1973 | Chang | |
| 3,908,305 A * | 9/1975 | Schroeder | 446/50 |
| 3,999,328 A * | 12/1976 | Schroeder | 446/50 |
| 4,027,422 A * | 6/1977 | Schroeder | 446/50 |
| 4,143,841 A | 3/1979 | Roeder | |
| 4,358,072 A | 11/1982 | Williamson | |
| 4,496,120 A * | 1/1985 | Eickmann | 244/56 |
| 4,591,114 A * | 5/1986 | Block | 244/120 |
| 4,714,444 A * | 12/1987 | Rendel | 446/61 |
| 4,736,910 A | 4/1988 | O'Quinn et al. | |
| 4,746,082 A | 5/1988 | Syms et al. | |
| 5,035,382 A | 7/1991 | Lissaman et al. | |
| 5,568,903 A | 10/1996 | Pena et al. | |
| 6,425,794 B1 * | 7/2002 | Levy et al. | 446/34 |
| 6,682,017 B1 | 1/2004 | Giannakopoulos | |
| 6,719,224 B2 | 4/2004 | Enomoto et al. | |
| 6,776,373 B1 | 8/2004 | Talmage, Jr. | |
| 6,840,480 B2 | 1/2005 | Carroll | |
| 7,237,750 B2 * | 7/2007 | Chiu et al. | 244/119 |
| 7,262,395 B2 | 8/2007 | Bilyk et al. | |
| 7,318,565 B2 * | 1/2008 | Page | 244/63 |
| 8,136,766 B2 * | 3/2012 | Dennis | 244/199.4 |
| 8,162,263 B2 | 4/2012 | Wong et al. | |
| 8,328,130 B2 * | 12/2012 | Goossen | 244/23 A |
| 2006/0091258 A1 | 5/2006 | Chiu et al. | |
| 2006/0192047 A1 | 8/2006 | Goossen | |
| 2008/0223994 A1 | 9/2008 | Greenley | |
| 2011/0057074 A1 | 3/2011 | Woodworth et al. | |

OTHER PUBLICATIONS

Transmittal; International Search Report; and Written Opinion of the International Searching Authority for International Application No. PCT/US2013/053271 with a mailing date of Nov. 26, 2013.
Welcome to Paparazzi, retrieved from <http://paparazzi.enac.fr/wiki/Main_Page> on May 31, 2012.

* cited by examiner

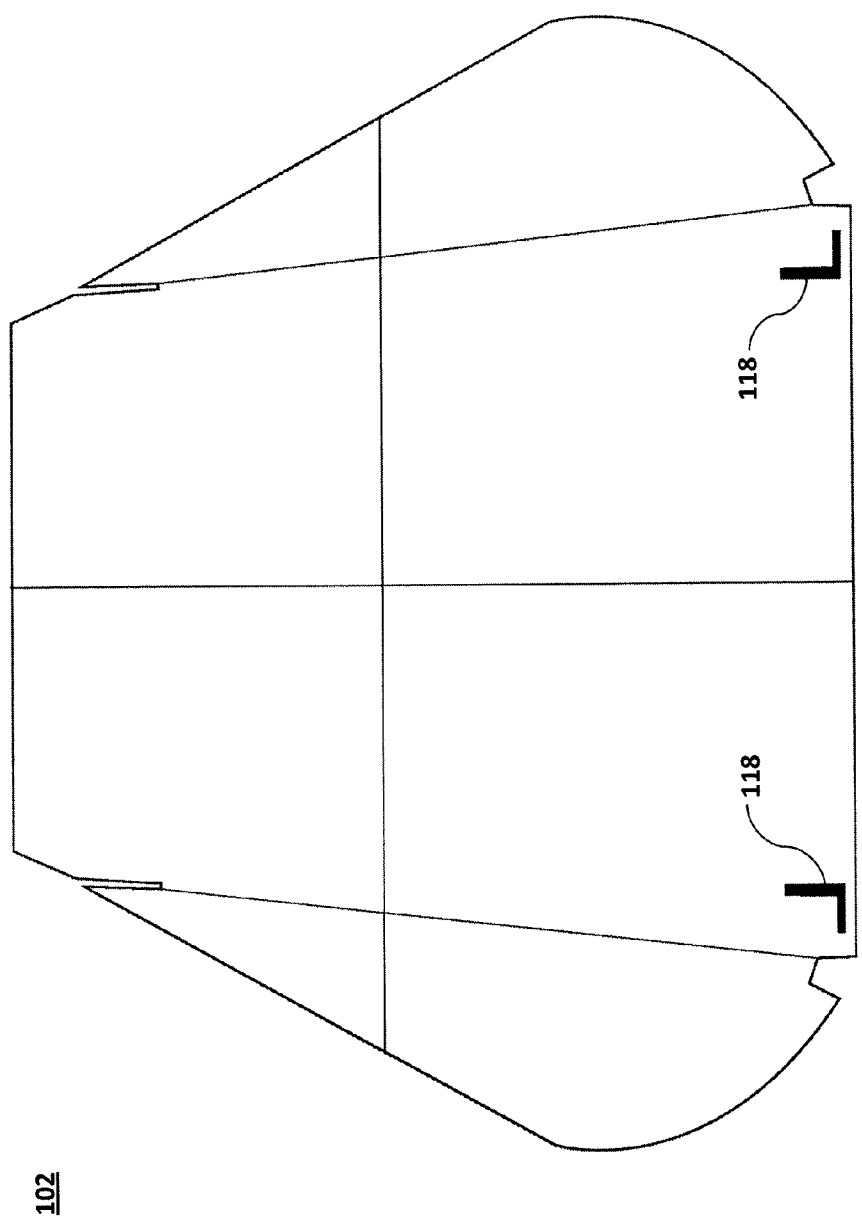

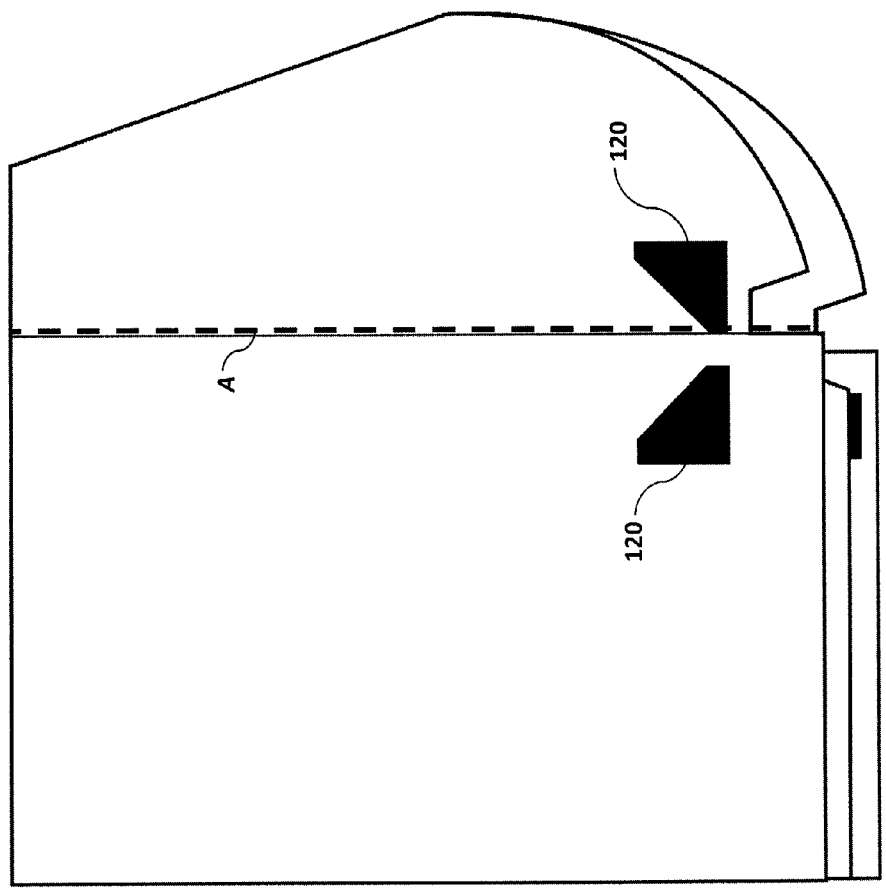

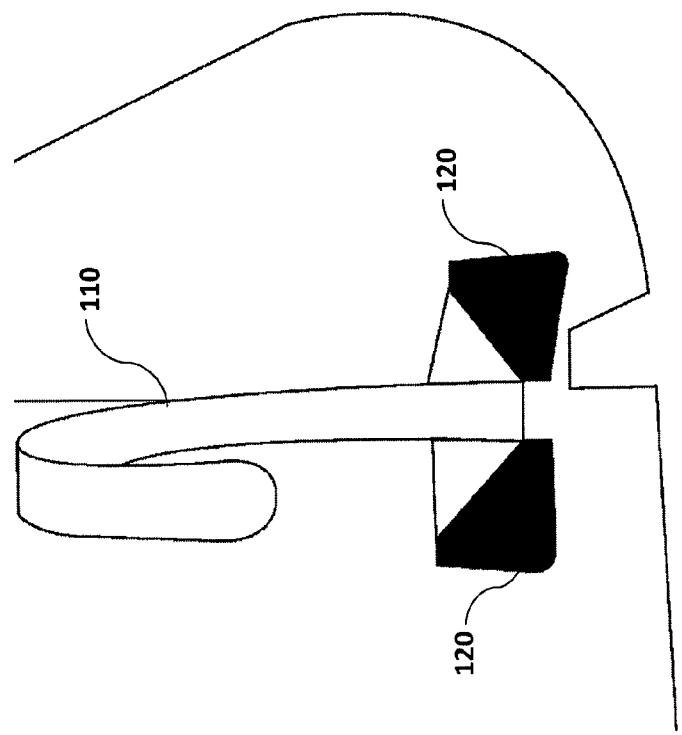
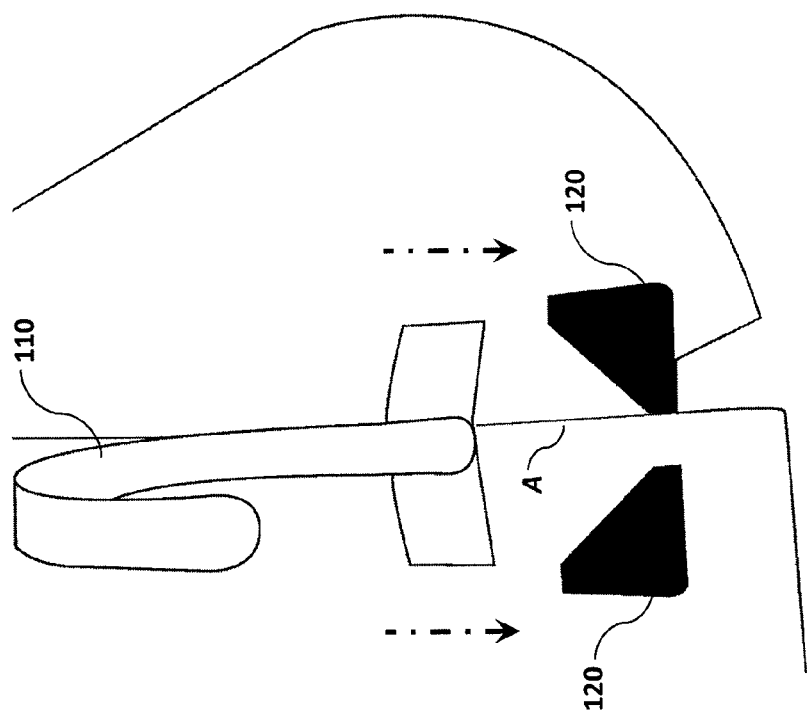
Figure 9d
Figure 9c

MODULAR MINIATURE UNMANNED AIRCRAFT WITH VECTORED-THRUST CONTROL

CROSS REFERENCE TO RELATED APPLICATIONS

This application is a divisional of U.S. patent application Ser. No. 13/567,015, filed Aug. 4, 2012 (now U.S. Pat. No. 8,500,067, issued Aug. 6, 2013), which is a continuation-in-part of commonly owned U.S. patent application Ser. No. 12/556,225, filed on Sep. 9, 2009, by Adam Woodworth and Brandon Suarez, both of which are incorporated herein by reference.

TECHNICAL FIELD

The present invention relates to miniature unmanned aircraft. More particularly, the present invention relates to aircraft that use thrust-vectoring ("T/V") modules to enable the aircraft to execute tight-radius turns at high angular rates over a wide range of speeds.

BACKGROUND INFORMATION

The use of unmanned aerial vehicles ("UAVs") has become important in recent years for a wide variety of applications, including military uses. In some applications, a UAV may be required to be capable of maneuvering quickly or in tight spaces. Further, the UAV may be required to have this capability over a wide range of speeds.

Conventional, fixed-wing, small UAVs generally lack the maneuverability and speed range that would be necessary for operating in an urban canyon. Generally, this is due to a reliance upon airflow over control surfaces derived from the forward airspeed of the vehicle. Therefore, vertical-takeoff-and-landing ("VTOL") aircraft have been used to address this maneuvering challenge at low speeds. For example, in U.S. Pat. No. 6,719,244, a VTOL aircraft uses lateral tilting of the propellers to induce unbalanced torque-induced and gyroscopic moments which act on the aircraft about an axis essentially perpendicular to the tilt axis. Similarly, U.S. Patent Application Publication No. 2006/0192047 discloses a hovering aerial vehicle that uses two ducted fans attached to a common drive housing. In operation, the vanes below each fan body may be tilted differentially or in unison to generate control forces. In certain aspects, fixed wings may be attached to the ducts for forward flight capability.

Despite the foregoing advancements, a need still exists for an aircraft capable of executing tight-radius turns at high angular rates over a wide range of speeds. Moreover, a need exists for a low-cost and/or durable aircraft capable of executing tight-radius turns at high angular rates over a wide range of speeds. Finally, a need exists for an aircraft that may be organically deployed and that involves only nominal assembly.

Accordingly, the subject disclosure provides durable aircraft that use thrust-vectoring modules to enable the aircraft to execute tight-radius turns at high angular rates over a wide range of speeds. The subject disclosure also describes aircraft that employ frangible aircraft components to mitigate or eliminate damage by transferring landing energy into kinetic energy operating on the frangible components upon impact.

SUMMARY

The present disclosure endeavors to provide an aircraft that uses thrust vectoring (T/V) modules to enable the aircraft to execute tight-radius turns at high angular rates over a wide range of speeds.

According to a first aspect of the present invention, a T/V module for providing propulsion forces in an aerial vehicle comprises a propeller; an electric motor, wherein the electric motor is configured to rotate the propeller; a rigid link having a first end and a second end, wherein the first end is coupled with the electric motor; a positioning device coupled with the second end of the rigid link, wherein the positioning device is configured to position the electric motor by rotating the rigid link; and a retention mechanism for passively securing the T/V module to the aerial vehicle.

According to a second aspect of the present invention, an aerial vehicle for reducing impact loads comprises an airframe; a payload module coupled to the airframe via one or more passive engagement tabs; and a battery module configured to interface with the airframe and the payload module, wherein the payload module and the battery module are configured to eject from the airframe during impact.

According to a third aspect of the present invention, a folding airframe comprises: a plurality of integrated hinges, each integrated hinge defining a fold line; a locking mechanism, wherein the locking mechanism is used to lock the folding airframe in a deployed position; and at least one passive retention device for securing one or more flight components to the folding airframe, wherein said one or more flight components are configured to eject upon sudden impact.

According to a fourth aspect of the present invention, an aircraft for unmanned aviation comprises an airframe having two or more shallow pockets, each shallow pocket comprising an electrical interface; a payload module coupled to the airframe; a battery module configured to interface with the airframe and the payload module; two or more thrust vectoring modules configured to interface with the payload module via the electrical interface, each of said two or more T/V modules being configured to reside within one of the shallow pockets; wherein said two or more T/V modules provide lateral and longitudinal control to the aircraft by directly controlling a thrust vector; and an electronics module configured to provide commands to the at least two T/V modules.

According to certain aspects, the locking mechanism may comprise one or more rods fixed to an edge of the folding airframe. The one or more rods may be fixed to the folding airframe using at least one clip or a magnet. Alternatively, the locking mechanism may comprise one or more magnets at each fold line.

According to certain aspects, the electric motor's rotational speed may be controlled to produce a desired amount of thrust.

According to certain aspects, the positioning device may comprise an electric servo.

According to certain aspects, the retention mechanism may comprise a high-strength permanent magnet.

According to certain aspects, the positioning device may be configured to position the electric motor by rotating the rigid link about at least one degree of freedom.

According to certain aspects, the thrust vectoring module may be configured to passively break away from the aerial vehicle upon sudden impact.

According to certain aspects, the thrust vectoring module may be electrically interfaced with the aerial vehicle.

According to certain aspects, the battery module may be configured to eject from the airframe along an ejection path that does not intersect with any other aircraft component.

According to certain aspects, the aerial vehicle may comprise a ramp interface between the airframe and the payload module.

According to certain aspects, the payload module may comprise avionics and sensor payloads.

According to certain aspects, each thrust vectoring module may comprise a propeller, an electric motor and a positioning device configured to position the electric motor.

According to certain aspects, the thrust vectoring modules may be configured to independently control a pitch, a roll, and a yaw of the aircraft.

According to certain aspects, the airframe may be foldable into a compact, stowable configuration.

BRIEF DESCRIPTION OF THE DRAWINGS

These and other advantages of the present invention will be readily understood with reference to the following specifications and attached drawings, wherein:

FIGS. 8a through 8d illustrate a folding process for compactly packing a modular miniature unmanned aircraft;

FIGS. 9a through 9d illustrate a dihedral brace for use as a landing skid and locking element on a modular miniature unmanned aircraft;

DETAILED DESCRIPTION

Figure 1:
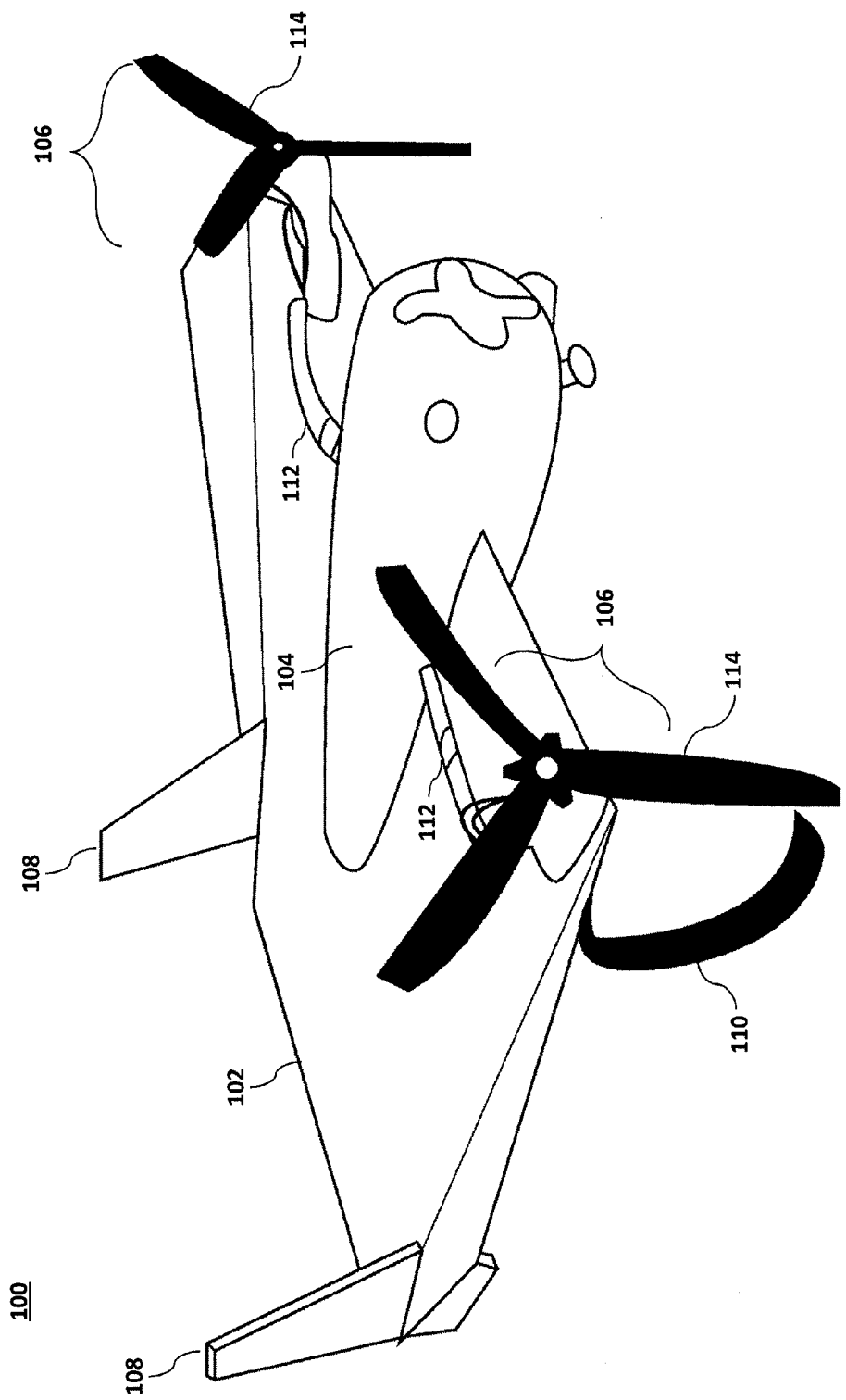
FIG. 1 illustrates a first modular miniature unmanned aircraft with vectored-thrust control in a deployed configuration.

Embodiments of the present invention will be described hereinbelow with reference to the accompanying drawings.

In the following description, well-known functions or constructions are not described in detail because they would obscure the invention in unnecessary detail.

The present disclosure endeavors to provide a modular miniature unmanned aircraft with vectored-thrust control enabled to synergistically mesh sensor and aircraft capabilities into a system capable of navigating through highly cluttered urban environments. Whereas traditional force production techniques rely on airflow over control surfaces, a modular miniature unmanned aircraft with vectored-thrust control may employ articulated electric motors to directly change the thrust vector. Directly changing both the magnitude and the direction of the thrust vector allows the modular miniature unmanned aircraft to execute tight-radius high-angular-rate turns, over a wide speed range and in the post-stall regime.

Moreover, the modular miniature unmanned aircraft airframe may feature a low aspect ratio (i.e., the ratio of a wing's length to its breadth) planform, which permits rapid deceleration/perch maneuvers, and permits benign controlled flight at large angles of attack. Such features provide the additional advantages of reduced system complexity and increased durability. Further, all of the moving parts of the modular miniature unmanned aircraft are preferably co-located in ruggedized modules or "pods", while making the actual airframe a fairly low-cost, disposable and/or interchangeable element of the modular miniature unmanned aircraft system.

The modular miniature unmanned aircraft of the present disclosure may be configured to execute a turn having a radius of less than or equal to one wing span. Moreover, the modular miniature unmanned aircraft may be further configured to operate with an airspeed of zero with its nose pointing vertically, thereby operating in a hover mode. While in a hover mode, the aircraft may rotate about a vertical axis. Finally, the modular miniature unmanned aircraft can perform a pirouette maneuver at a rate of more than one rotation per second.

The maximum angular rate of the modular miniature unmanned aircraft is generally a function of the forward airspeed, with the only limitation being equivalent to the physical limits associated with centrifugal forces at the given forward airspeed. Therefore, turning and rotating maneuvers of the modular miniature unmanned aircraft may be executed at virtually any forward airspeed between zero and the maximum forward airspeed of the modular miniature unmanned aircraft itself.

As will be discussed in greater detail below, T/V modules serve as a propulsion means for the aircraft, while allowing for quick aircraft assembly time and yielding a vehicle configuration that is more robust to landing impact loads. Each T/V module generally comprises a thrust-generating propeller that produces varying amounts of thrust at varying rotational speeds, an electric motor that spins the propeller at the varying speeds, a rigid link that the electric motor mounts to a positioning device that rotates the rigid link, and a retention device that passively retains the motor module against the aircraft's structure. Each T/V module may be configured to electrically couple with the aircraft (e.g., an electronics module) via a cable or directly via an electrical interface through the base of the T/V module.

As disclosed herein, a modular miniature unmanned aircraft configuration may be developed into a scalable series of vehicles, ranging from, for example, 6 inches to 100 inches in length. However, the modular miniature unmanned aircraft illustrated in the figures is illustrated as having a full length of approximately 24 inches.

The modular miniature unmanned aircraft vehicle may be equipped with an autopilot such as, for example, Paparazzi autopilot, which is used for flight tests in support of the Micro Air Vehicle Small Business Innovative Research grant. Paparazzi autopilot is an open-source hardware and software project intended to create an exceptionally powerful and versatile autopilot system by allowing and encouraging input from the community. Features of the Paparazzi autopilot include its combination of infrared thermopiles and inertial measurement for attitude sensing, providing a robust and accurate attitude estimate that requires no ground calibration and can recover from any launch attitude.

Alternatively, the modular miniature unmanned aircraft vehicle may be controlled using conventional wireless remote control technologies. For example, flight may be controlled using a handheld remote control, portable computer (e.g., laptop or smart phone), vehicle or command station via a network (e.g., the Internet). Finally, the aircraft may follow a predetermined flight path using autopilot stored to the vehicles on-board memory (e.g., a computer readable medium).

Referring to FIG. 1, a first modular miniature unmanned aircraft 100 with vectored-thrust control is depicted in a fully deployed configuration. The modular miniature unmanned aircraft 100 generally comprises an airframe 102, two or more fins 108, an electronics module 104, two or more skids 110, and two or more T/V modules 106. As illustrated, the airframe 102 forms a wing planform having a low aspect ratio (i.e., short and stubby wings).

Adjusting the aspect ratio and planform (e.g., the shape and layout of a fixed-wing aircraft's fuselage and wing) can be used to predict the aerodynamic performance of a wing. As exemplified in Equation 1, the aspect ratio (AR) is defined as the square of the wingspan b divided by the area S of the wing planform—this is equal to the length-to-breadth ratio for constant breadth. Accordingly, it may be preferable to employ a wing having a low AR value. The AR value of an aircraft as illustrated in the figures may be, for example, 1.26. However, the AR value may be readily adjusted by the designer to achieve a particular purpose.

$$AR = \left(\frac{b^2}{S}\right) \qquad \text{Equation 1}$$

Low-aspect-ratio wing planforms encourage more efficient structures and higher instantaneous roll rate. Accordingly, such planforms tend to be used by fighter aircraft and by very high-speed aircraft where maneuverability and speed are important.

Each T/V module 106 comprises a directly articulated electric motor for providing lateral and longitudinal control. Specifically, as will be disclosed below, the directly articulated electric motor may be accomplished using a DC electric motor coupled with an articulating arm, which may be controlled by an electric servo. The two T/V modules 106 may be deflected in unison for pitch control and differentially for yaw control. Low mass propellers 114 may be used to mitigate unwanted force coupling with motor deflection. The propellers may be either 2 or 3 blade configuration and may comprise a fiber reinforced polymer material. The propellers 114 may operate in a counter-rotational mode to cancel or offset gyroscopic effects and improve cruise efficiency due to a reduction in induced drag by spinning in a direction such that the propeller wake opposes the spin direction of the normal tip vortex. In order to operate in a counter-rotational mode, the left and right propellers may be mirror images of each other. While only two T/V modules 106 are illustrated, additional T/V modules 106 may be integrated as desired for a particular use. For example, to enhance VTOL operation, a tri-motor or quad-motor configuration may be used. Specifically, additional T/V modules 106 may be provided at the aft end of the airframe 102.

Figure 11:
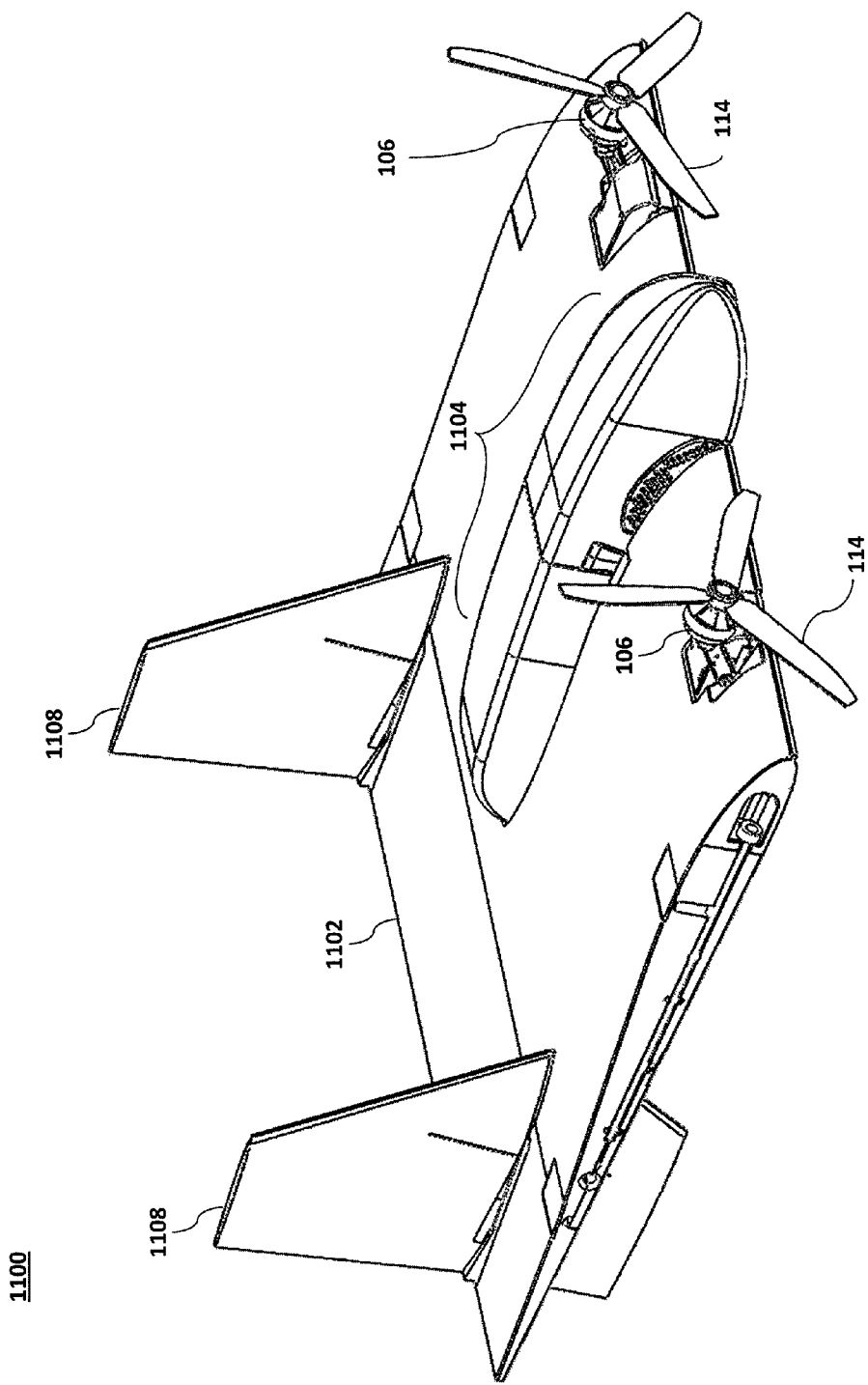
FIG. 11 illustrates a second modular miniature unmanned aircraft with vectored-thrust control in a deployed configuration.

As illustrated, a modular miniature unmanned aircraft 100 features a modular vehicle architecture. A modular vehicle architecture facilitates airframe 102 interchangeability, including, for example, disposable airframes, folding airframes, and/or the use of mission-specific airframes (e.g., a smaller planform, which could be employed in gusty environments). For example, as will be discussed in greater detail below, FIG. 11 illustrates a second modular miniature unmanned aircraft 1100 employing similar techniques, but having a different airframe 1102. Accordingly, each component, or module, should be easily detached from the aircraft 100 and substantially self-contained in a module or "pod."

Figure 2:
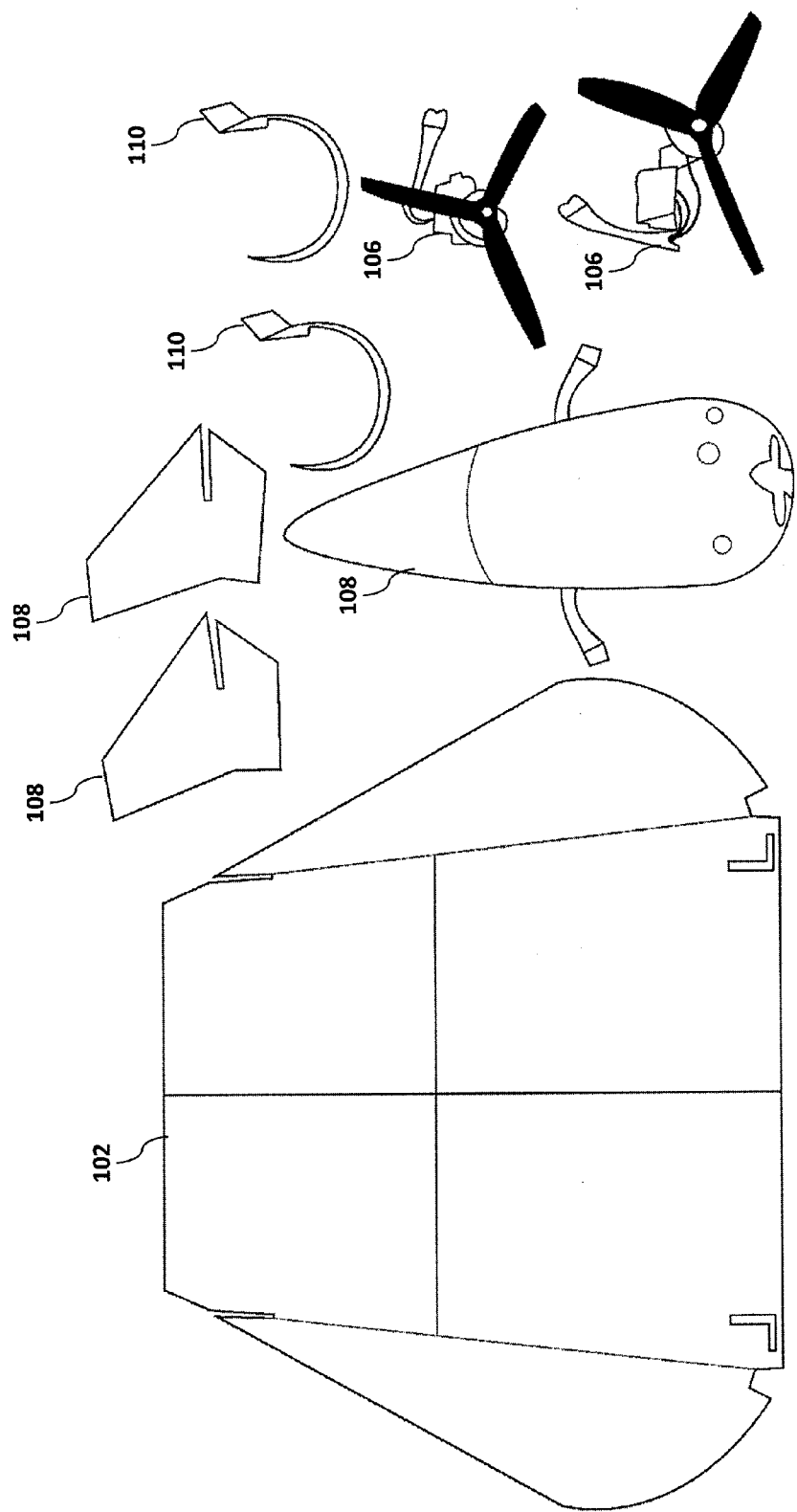
FIG. 2 illustrates the major components of a disassembled first modular miniature unmanned aircraft with vectored-thrust control.

Referring to FIG. 2, a modular miniature unmanned aircraft 100 with vectored-thrust control generally comprises eight major components or modules: the airframe 102, two fins 108, two combination landing skids 110 (e.g., dihedral braces), an electronics module 108, and T/V modules 106. In certain situations, it may be preferable to construct the airframe 102, fins 108, and skids 110 from a low cost disposable material (e.g., expanded polypropylene foam (EPP)). Therefore, in the event of a crash, the airframe 102, fins 108, and skids 110 may be readily and relatively inexpensively replaced, while the more costly components, such as the electronics module 108 and T/V modules 106, are reused.

Figure 3:
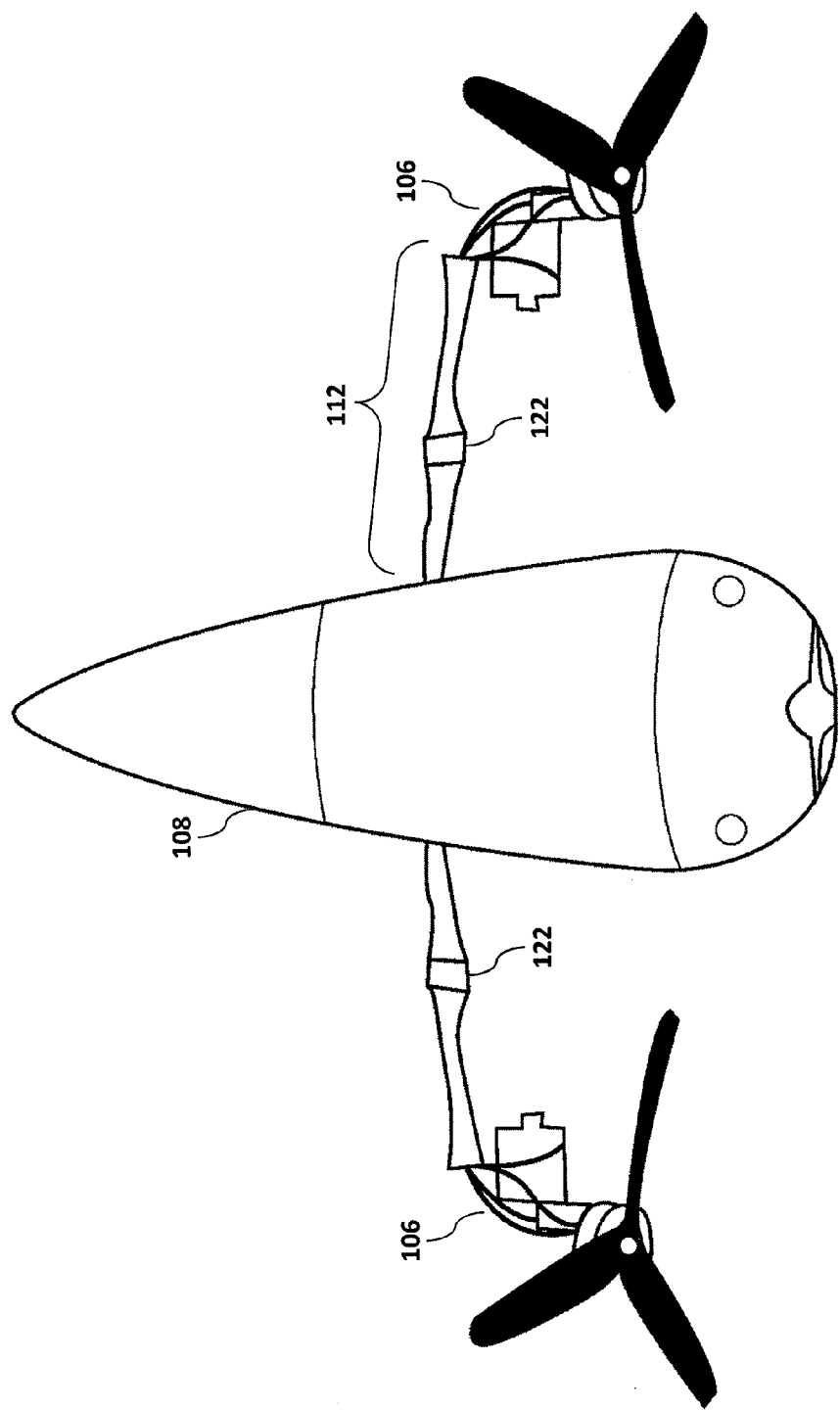
FIG. 3 illustrates an electronics module and two T/V modules for a modular miniature unmanned aircraft.

FIG. 3 illustrates an electronics module 104 and two T/V modules 106, which may serve as the primary flight components for a modular miniature unmanned aircraft 100. The electronics module 108, or centerline avionics/payload "pod," houses the vehicle's avionics, propulsion battery, and sensor payload while providing rigidity to the airframe 102 when assembled. While the electronics module 108 is depicted as being a single module, as will be discussed in greater detail below, the electronics module 108 may comprise multiple modules or "sub-modules." For example, the electronics module 108 may be divided into two modules, a first module for housing heavier components, such as the battery, and a second module for housing the more delicate components, such as the avionics, surveillance payload, sensor payload and any other electronic equipment. More specifically, the aircraft 100 may further include one or more sensors used to facilitate autonomous flight. Such sensors may include, but are not limited to, ultrasonic sensor, infrared sensors, radar and the like. The electronics module 108 pod, or housing, may be fabricated from, for example, a plastic polymer such as acrylonitrile butadiene styrene, ABS. The packaging volume of the electronics module may be approximately 1.5×1.5×1.0 inch.

The T/V modules 106 provide propulsive power and control forces for the aircraft 100 during operation. Each T/V module 106 is electronically coupled with the electronics module 108 via a cable 112 or, as will be described below, through an integrated electrical interface. The cable 112 may be a bundle of conductors and configured to transmit both power and/or data signals between the electronics module 108 and the T/V modules 106. To facilitate quick detachment of a T/V module 106 from the electronics module 108, each cable 112 may comprise an electrical connector 122, such as a plug and socket connector. In embodiments where the cable 112 is configured to transmit both data signals and power, the data signal conductors may be shielded from the power conductors to reduce or eliminate interference or noise. The electronics module 108 and T/V modules 106 may be used to provide all of the necessary elements for controlled flight (i.e., the equipment to power and control the aerial vehicle).

Figure 4B:
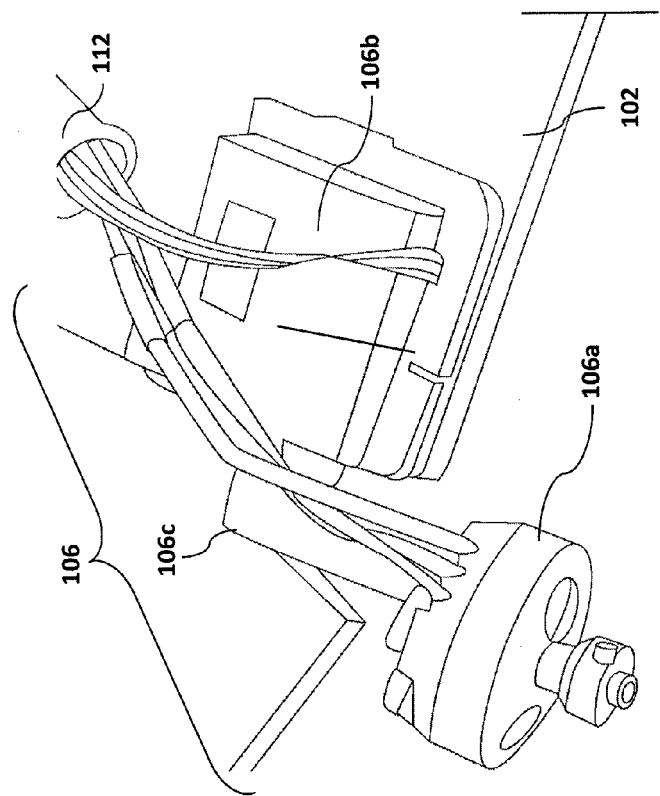
FIG. 4b illustrates the portion of FIG. 4a with a T/V module configured thereon.
Figure 4A:
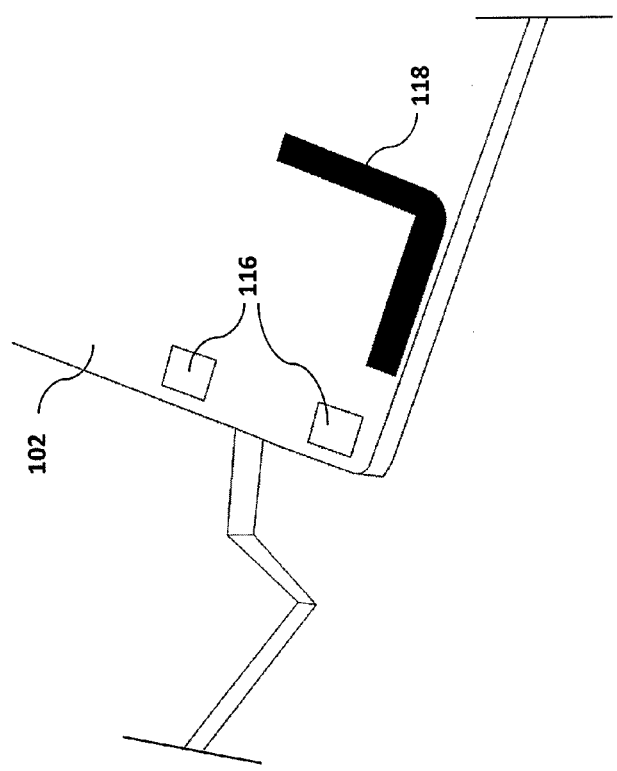
FIG. 4a illustrates a portion of an airframe configured to receive a T/V module.

The electronics module 108 and T/V modules 106 are preferably configured to be easily installed on and/or removed from the airframe 102 to facilitate stowage or permit use of other airframes (e.g., replacement or mission-specific). Thus, each T/V module 106 and/or electronics module 108 is preferably coupled with the airframe 102 via an integrated breakaway mount. The integrated breakaway mount should be sufficiently strong to keep the components secured in place during operation, but capable of giving way (e.g., detaching) upon sudden impact (e.g., ground impact, in-air impact or any other unexpected impact or collision) or intentional disassembly by the operator. For example, as illustrated in FIG. 4a, the airframe 102 may be provided with a retention device that passively retains each T/V module 106 to the aircraft's structure (e.g., airframe 102). The retention device for attaching the T/V modules 106 to the airframe 102 may comprise, for example, magnets 116 and/or one or more anti-rotation brackets 118. The magnets 116 may be mounted on a surface of the airframe 102 or embedded within the airframe 102. The magnets 116 are preferably configured to engage with corresponding magnets positioned on the underside of the T/V modules 106. Similar techniques may be used to attach the electronics module 108 to the airframe 102. For example, a series of magnets and clips may be provided on the airframe 102 and configured to engage with corresponding magnets and clips on the electronics module 108.

To avoid a reduction in aircraft performance, the magnets 116, brackets 118, and clips are preferable light in weight and high in strength. For example, the magnets 116 may be high-strength neodymium magnets. Neodymium magnets are permanent magnets made from an alloy of neodymium, iron, and boron to form the $Nd_2Fe_{14}B$ tetragonal crystalline structure. The anti-rotation brackets 118 and clips, on the other hand, may be constructed from, for example, lightweight plastics, metals or metal alloys. The anti-rotation brackets 118 are used to resist thrust and torque loads generated by the T/V module 106 by securing two or more sides of the T/V module's 106 base, yet allowing for the T/V modules 106 to detach in the event of impact. FIG. 4b illustrates the same view as FIG. 4a, but with a T/V module 106 secured in place.

Figure 5B:
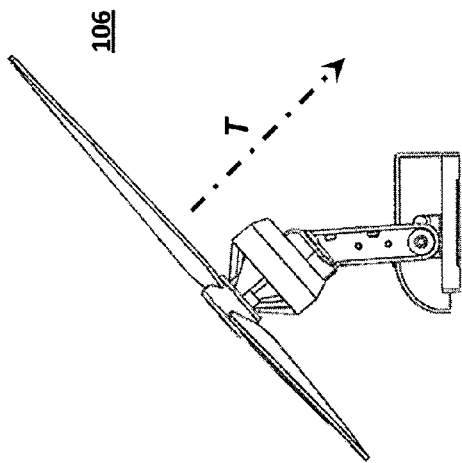
FIGS. 5a through 5c illustrate a T/V module for use with a modular miniature unmanned aircraft.
Figure 5C:
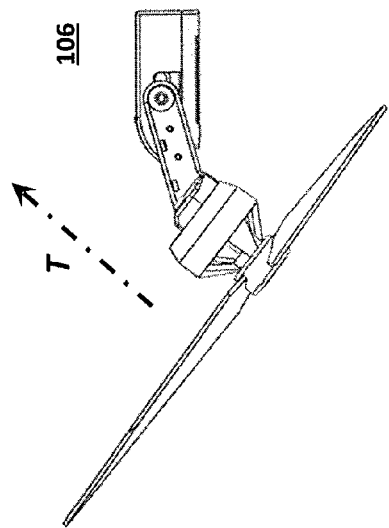
Figure 5A:
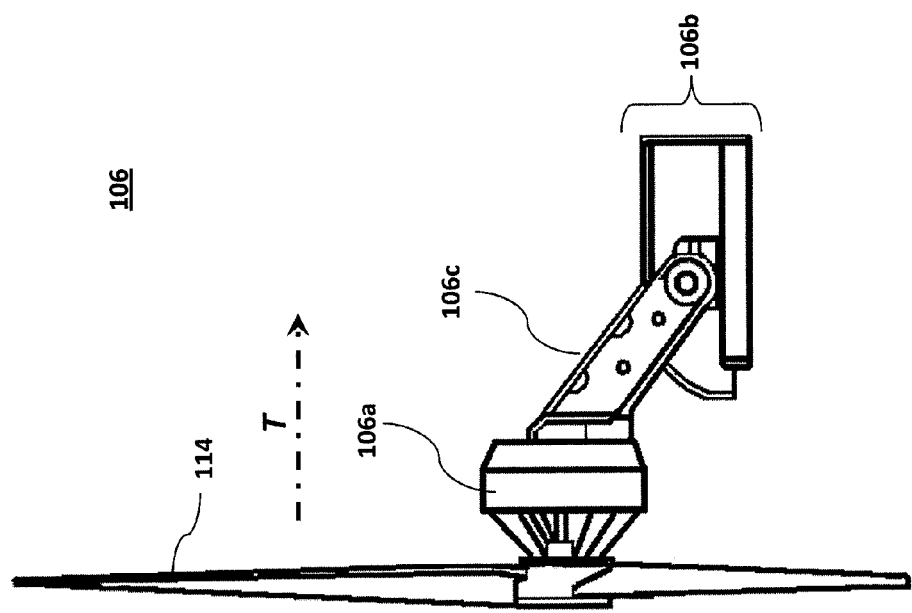
Figure 6A:
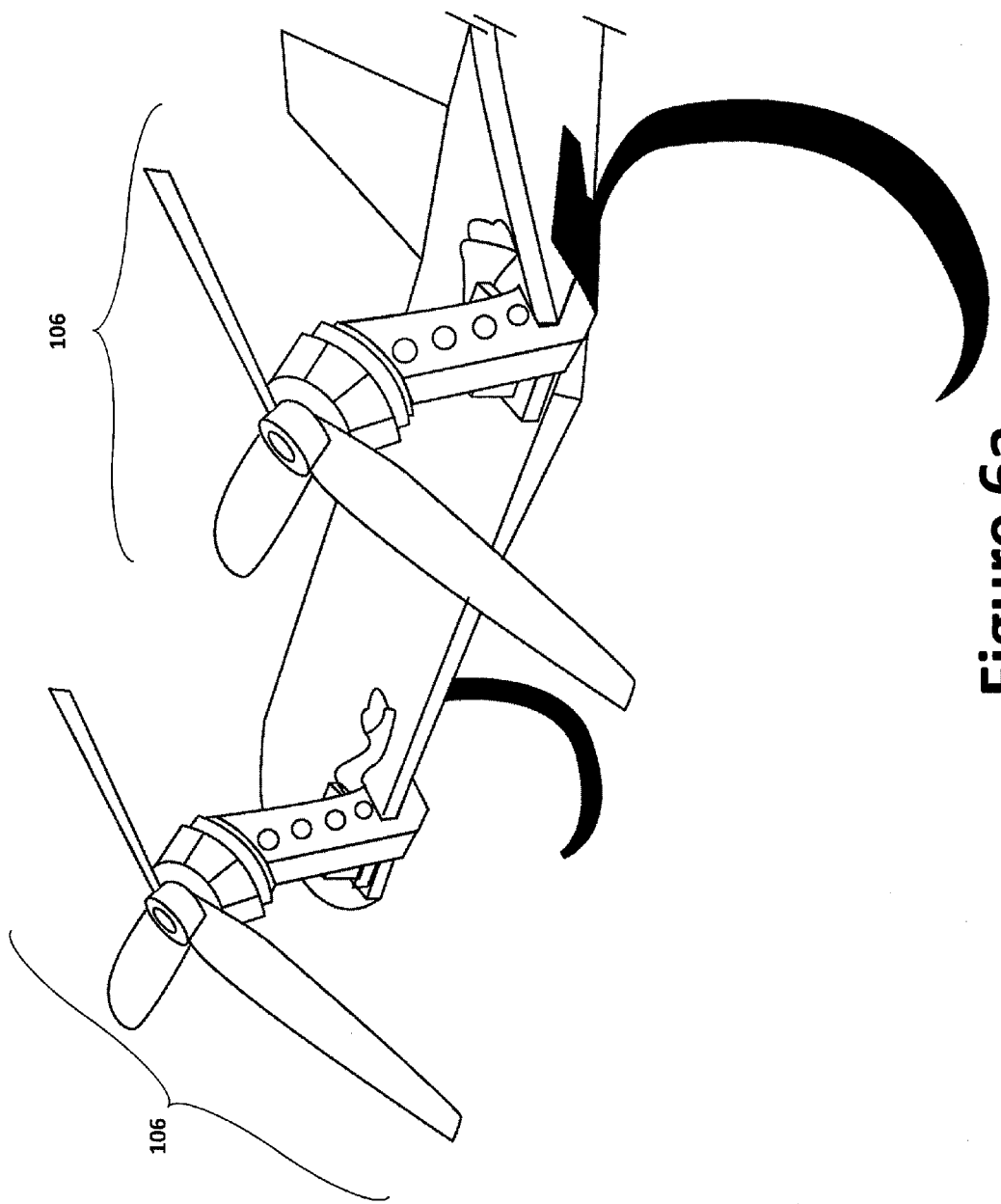
FIGS. 6a through 6d illustrate four directional motions based on action by the T/V modules of a modular miniature unmanned aircraft with vectored-thrust control.
Figure 6B:
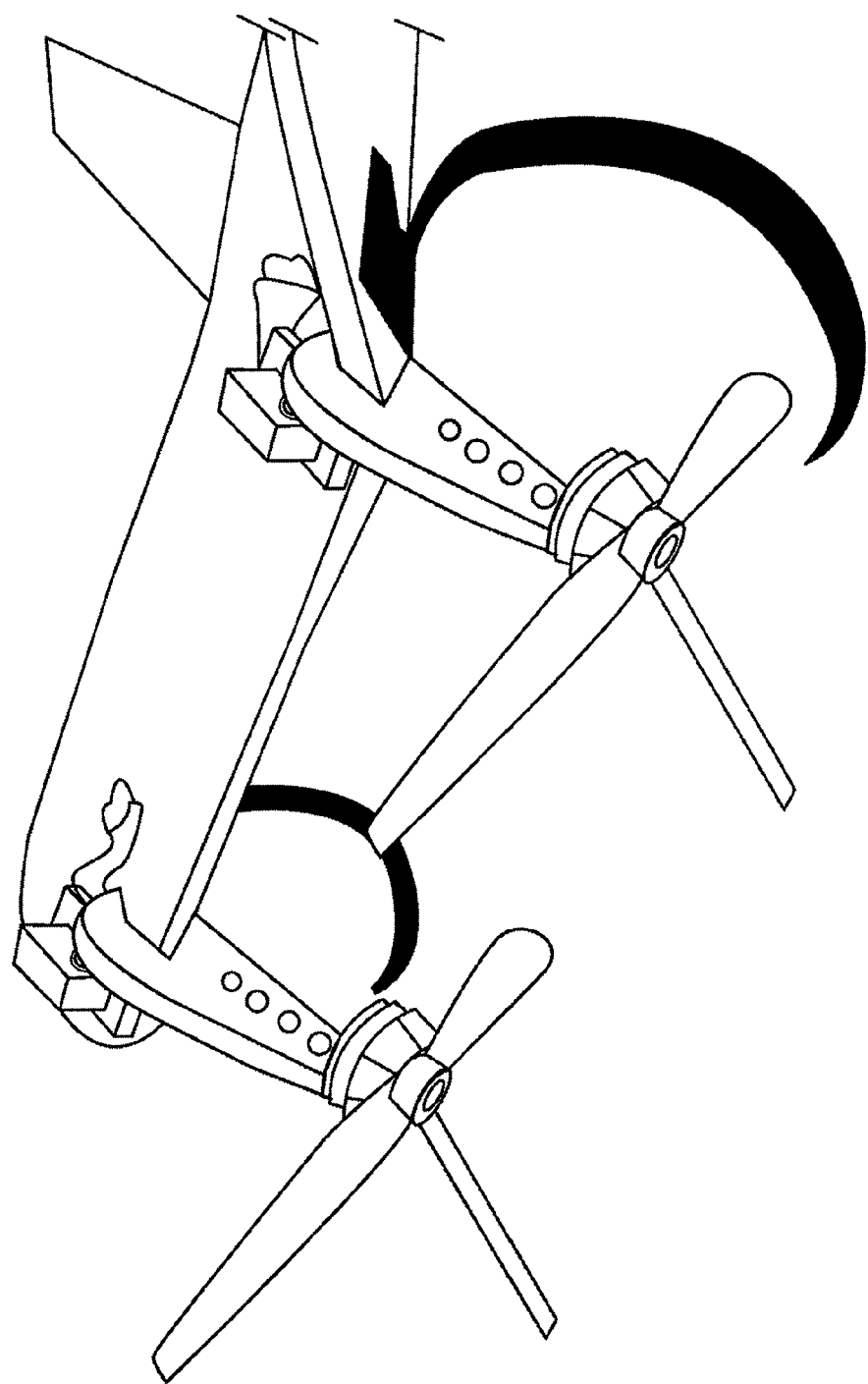
Figure 6C:
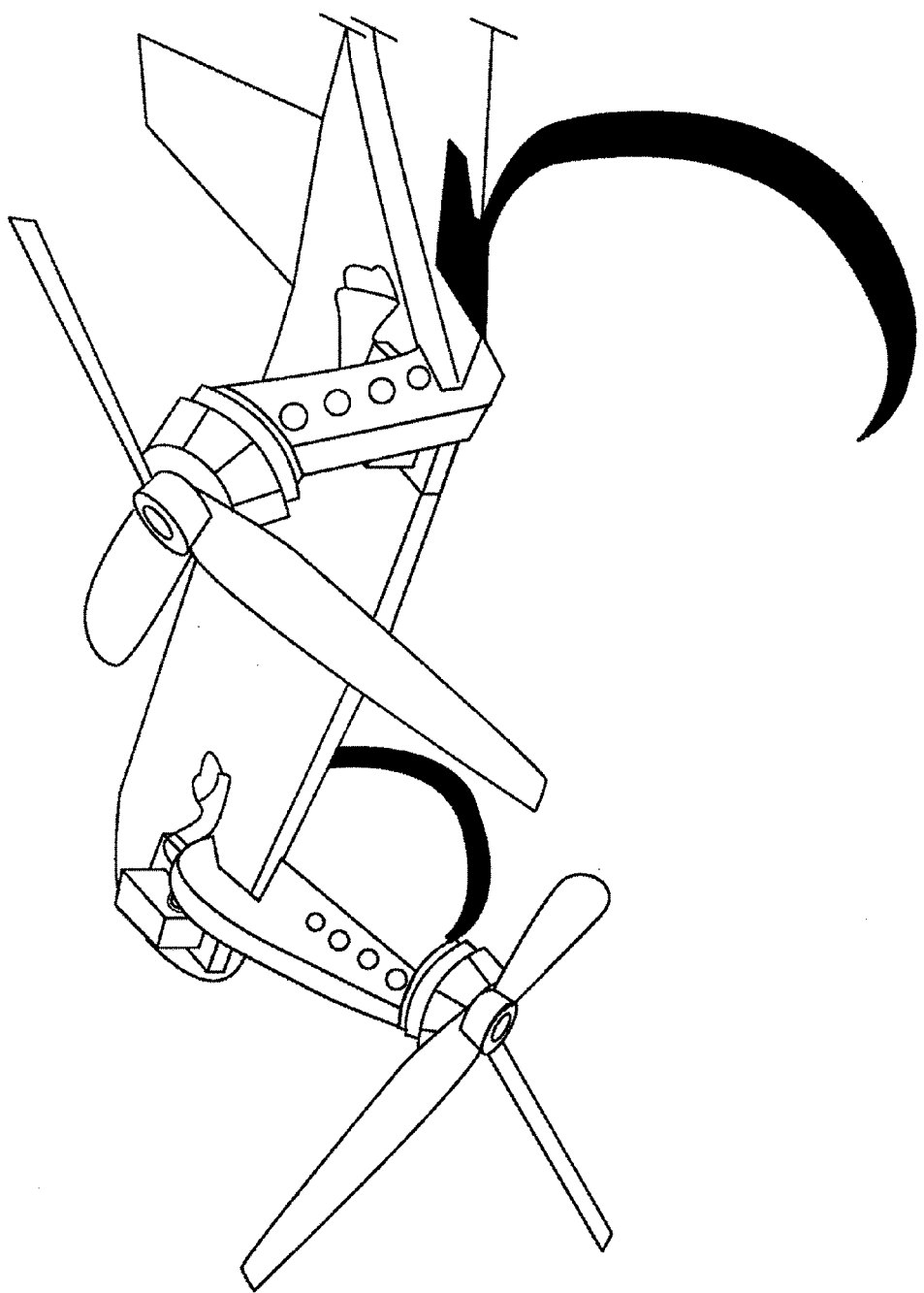
Figure 6D:
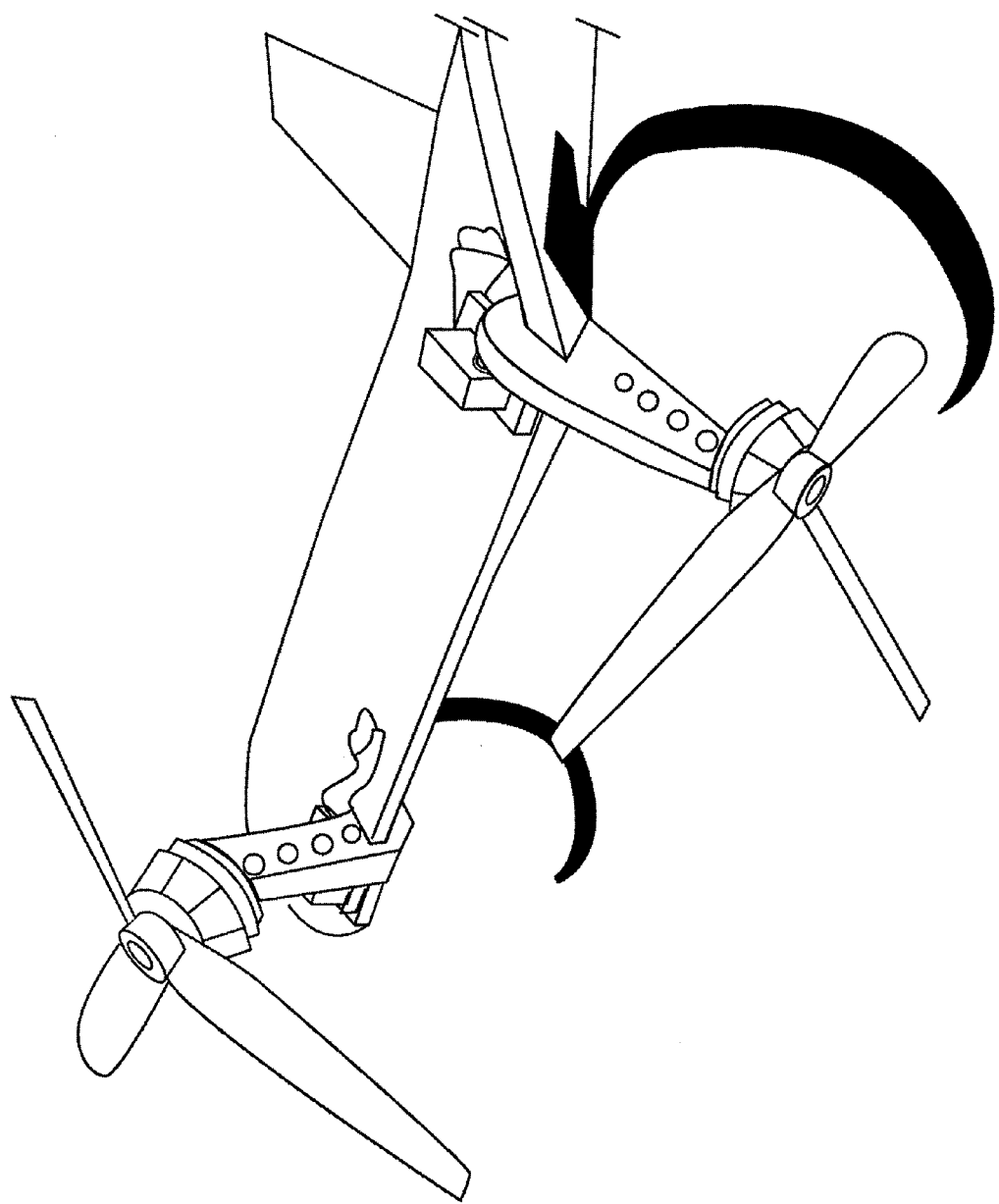

Detailed side views of a T/V module 106 are provided in FIGS. 5a through 5c. As illustrated in FIG. 5a, the T/V module 106 comprises an electric motor 106a, a positioning device 106b, a propeller 114, and a rigid link 106c. The electric motor 106a is preferably a brushless electric motor, while the positioning device 106b may comprise an electric servo, which is a type of actuator often used for radio control and small robotics. The electric motor 106a and positioning device 106b may each be powered by direct electric current supplied by the electronics module 104.

A typical servo comprises a small electric motor driving a train of reduction gears and a potentiometer connected to the output shaft. In operation, the position of the output shaft, measured by the potentiometer, can be continually compared to the commanded position from the control (e.g., the radio control). Any difference gives rise to an error signal in the appropriate direction, which drives the electric motor either forward or backward and moves the output shaft to the commanded position. When the servo reaches this position, the error signal reduces and then becomes zero, at which point the servo stops moving.

As illustrated, a rigid link 106c attaches the electric motor 106a to the positioning device's 106b output shaft. Although other types are available, the positioning device 106b is preferably a rotary actuator and operates by rotating the rigid link 106c about one degree of freedom while consuming minimal power and precisely controlling the position of the rigid link 106c. As the output shaft rotates, the rigid link 106c is rotated such that the electric motor 106a may be pointed forward (FIG. 5a), upward (FIG. 5b), downward (FIG. 5c), or at any point therebetween. However, for additional control, the positioning device 106b may be configured to direct the rigid link 106c in two or more degrees of freedom.

Thus, the thrust T generated by a propeller 114 mounted on the electric motor's 106a shaft can be directed to facilitate controlled flight. The amount of thrust T may be controlled by adjusting the speed of the electric motor 106a. All data and power required to operate the electric motor 106a and positioning device 106b may be delivered through the conductive cable 112. Thus, the electric motor 106a and positioning device 106b may each receive electric current and electric signals through the conductive cable 112 or other equivalent. Specifically, a conductive cable 112 may be exposed as illustrated in FIG. 1 or integrated with an airframe 1102 as discussed below with regard to FIG. 11.

As illustrated in FIGS. 6a through 6d, the T/V modules 106 may be used to provide fully controlled flight. Specifically, lateral and longitudinal control may be achieved solely through the use of the two or more T/V modules 106 whereby the T/V modules 106 may move in unison for pitch control or move differentially for roll control. For example, two T/V modules 106 may be used to control the aircraft's 100 pitch, yielding an up-down movement of the aircraft nose measured by the angle of attack. When both T/V modules 106 are pointed upward (FIG. 6a), the resulting thrust T is directed downward, thus resulting in a nose-up pitch. Conversely, when both T/V modules 106 are pointed downward (FIG. 6b), the resulting thrust T is directed upward, thereby resulting in a nose-down pitch.

The two T/V modules 106 may also be used to control the aircraft's 100 roll, resulting in an up-down movement of the wing tips measured by the roll or bank angle. For example, when the port side T/V module 106 is pointed upward and the starboard side T/V module 106 is pointed downward (FIG. 6c), the resulting thrust T on each side of the aircraft 100 is directed in an opposite direction, thus resulting in right roll. Conversely, when the port side T/V module 106 is pointed downward and the starboard side T/V module 106 is pointed upward (FIG. 6d), the resulting thrust T on each side of the aircraft 100 is directed in an opposite direction, thus resulting in left roll. Finally, yaw control may be achieved through differential thrust commands to the T/V modules 106. Specifically, each T/V module 106 may be separately controlled, thus the aircraft's 100 yaw may be controlled by adjusting the speed of a T/V module 106.

The fully articulated movement of each T/V module 106 also enables VTOL operation. During takeoff, for example, both T/V modules 106 may be initially pointed upward. As the electric motor 106a speed is increased with the T/V modules 106 in the upward configuration, the resulting thrust causes the nose end of the aircraft 100 to lift off the ground, while the tail end initially remains on or near the ground. Then, the motor 106a thrust continues to increase and the T/V modules 106 begin to transition from the upward configuration to the forward configuration (e.g., as illustrated in FIG. 5a) until the aircraft 100 has achieved a hover mode.

When two T/V modules 106 are used, the aircraft planform is typically substantially perpendicular to the ground with the T/V module 106 in the forward direction during hover mode. However, additional T/V modules 106 may be integrated (e.g., at the aft end of the airframe 102) to enable a more traditional VTOL liftoff, whereby the aircraft is substantially parallel to the ground during liftoff and hover, wherein the T/V module 106 in an upward direction. Once in hover mode, the aircraft 100 may transition to a forward-flight mode.

Figure 7:
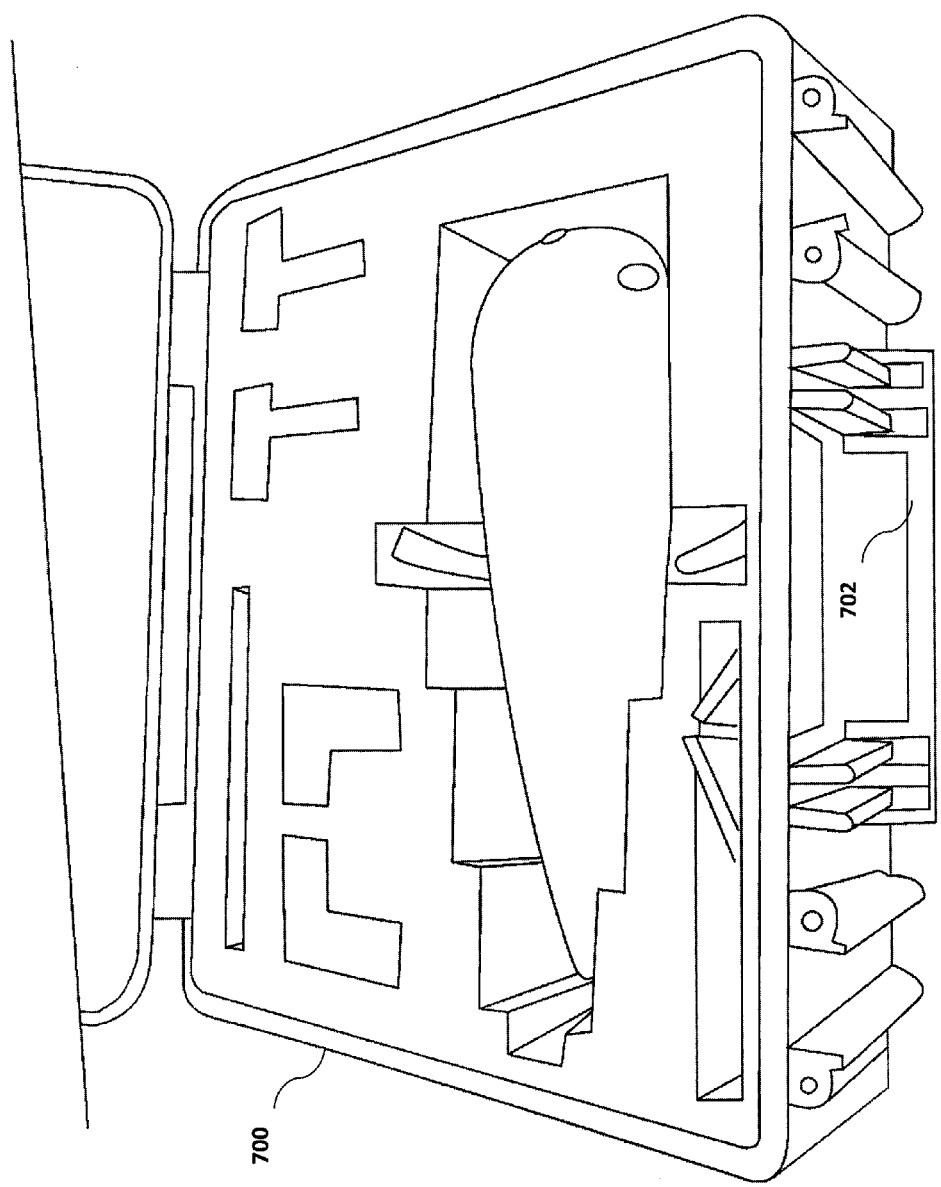
FIG. 7 illustrates the modular miniature unmanned aircraft with vectored-thrust control of FIG. 1 in a stowed configuration.

Referring to FIG. 7, the modular miniature unmanned aircraft 100 is shown in a stowed configuration. As a result of its modular architecture, the modular miniature unmanned aircraft 100 may be readily disassembled and transported in, for example, a carrying case 700. To prevent damage to the various modules or components, the case 700 may provide padded compartments configured to receive each module or component. To facilitate portability, the case 700 may be provided with a carrying handle 702. The portability of the modular miniature unmanned aircraft 100 encourages quick organic deployment of the aircraft 100.

Figure 8B:
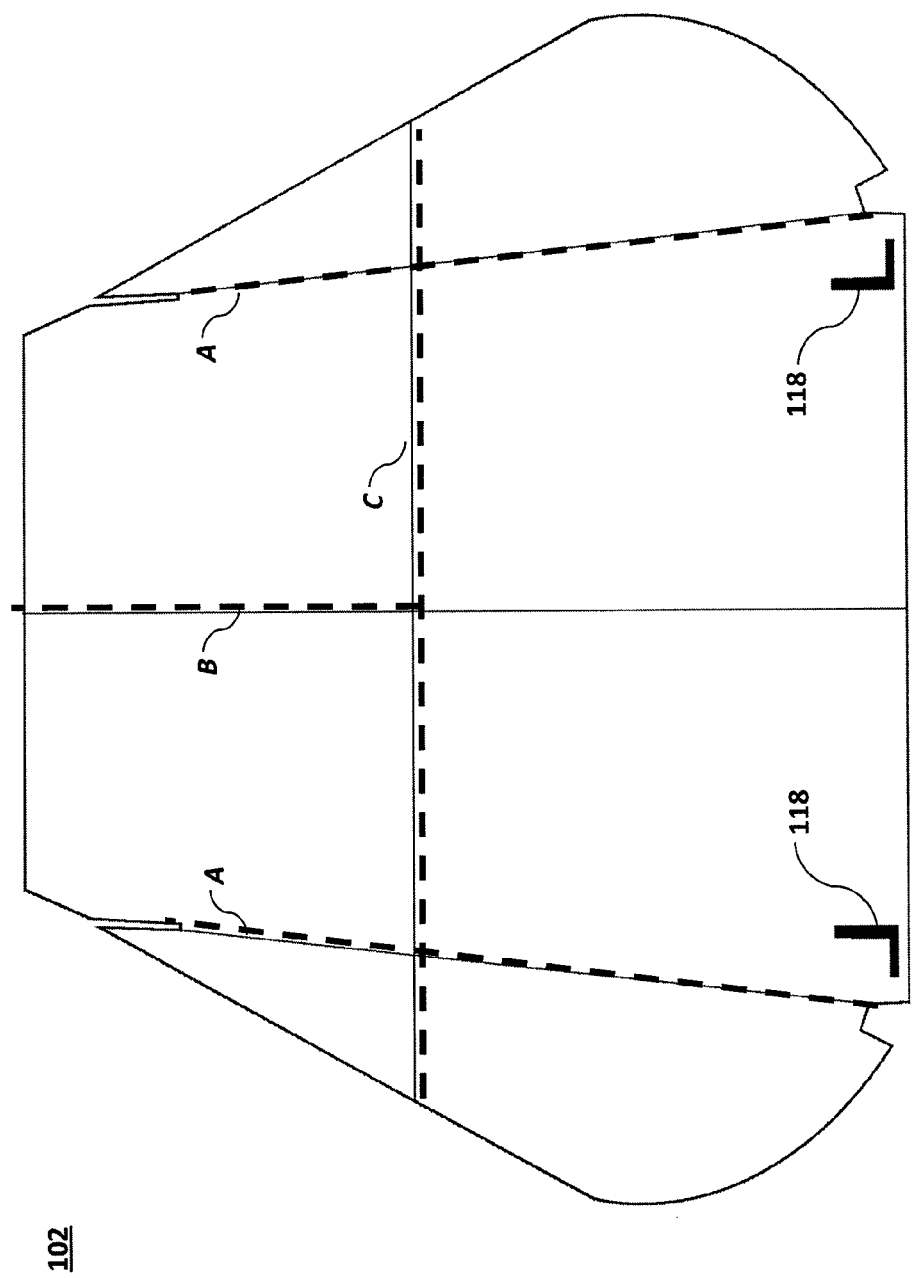
Figure 8C:
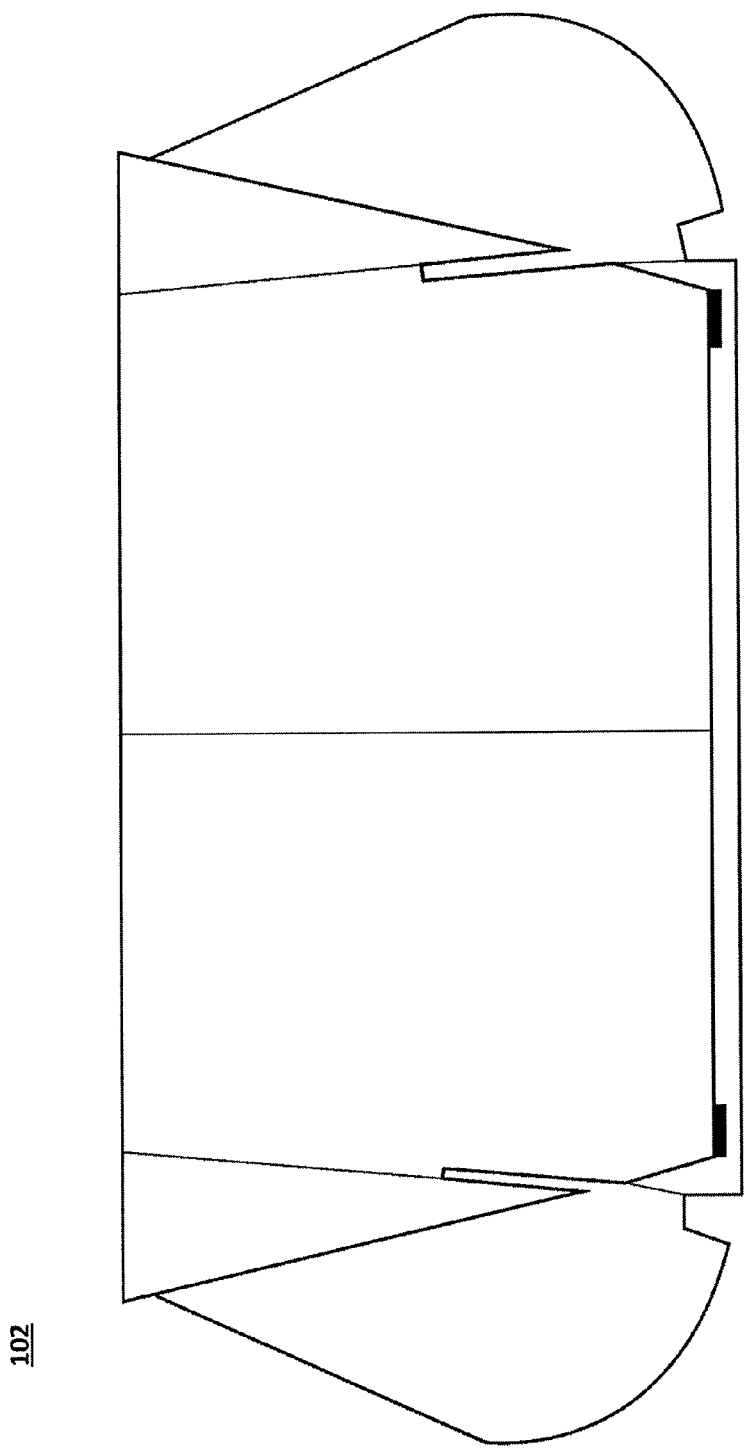

A folding wing configuration may be employed to reduce the stowed footprint of the aircraft 100, while minimizing the reduced structural strength inherent to adding fold lines to an aircraft wing. Referring to FIGS. 8a through 8d, because the airframe 102 does not require control surfaces or other integrated systems, the airframe 102 can be folded to significantly reduce the packed size of the aerial vehicle (i.e., when stowed). The folding scheme may include four integrated hinges, as illustrated in FIG. 8b. Two dihedral hinges A and a chord-wise hinge B may be located on the upper surface of the aircraft, and a centerline hinge C may be located on the lower surface. When deflected, the tip dihedral hinge locks the chord-wise hinge, thereby minimizing the amount of hardware needed to rigidize the airframe 102. As illustrated in FIG. 8d, the area of the airframe 102 may be reduced by approximately 75%, thereby facilitating stowage within, for example, a carrying case 700.

Figure 9B:
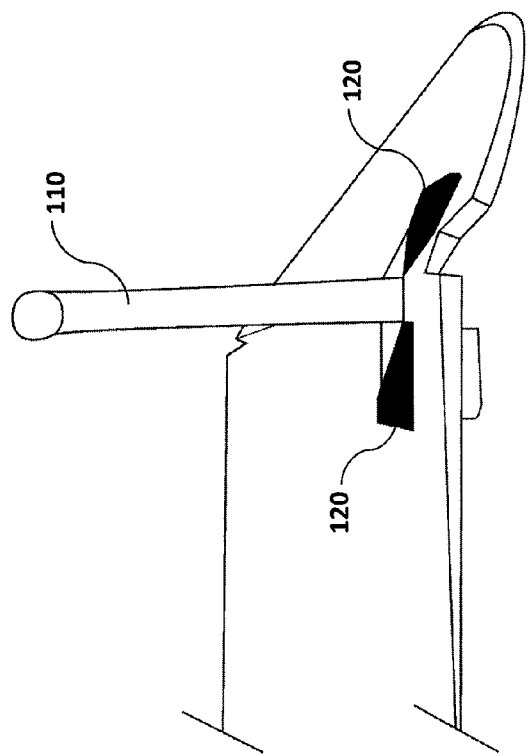
Figure 9A:
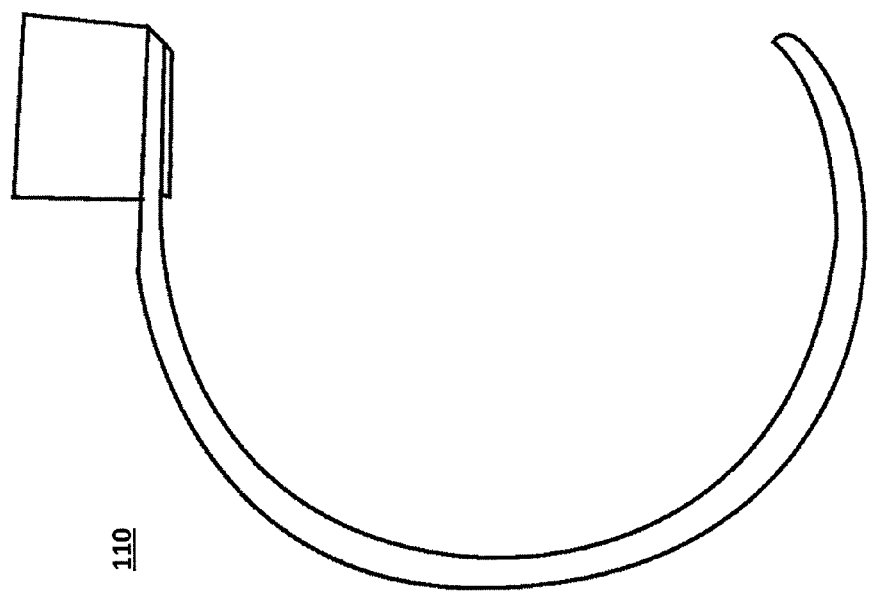

Referring to FIGS. 9a through 9d, the landing skids 110, also referred to as dihedral braces, may engage a pair of skid clips 120. As illustrated in FIG. 9b, the landing skids 110 may lock the dihedral hinges A at a predetermined angle when assembled. To lock the dihedral hinges A at a predetermined angle, one skid clip 120 is preferably positioned on each side of the dihedral hinge A as illustrated in FIGS. 9c and 9d. The upper end of the portion, which connects to the airframe 102, is preferably rigidly formed at the desired dihedral hinge angle. Thus, coupled with the electronics module 104, which locks the centerline hinge C, the airframe 102 is fully rigidized when assembled in a deployed configuration. As a result, the landing skids 110 and electronics module 104 may be the only fasteners needed to hold the airframe 102 in the deployed configuration.

Figure 10:
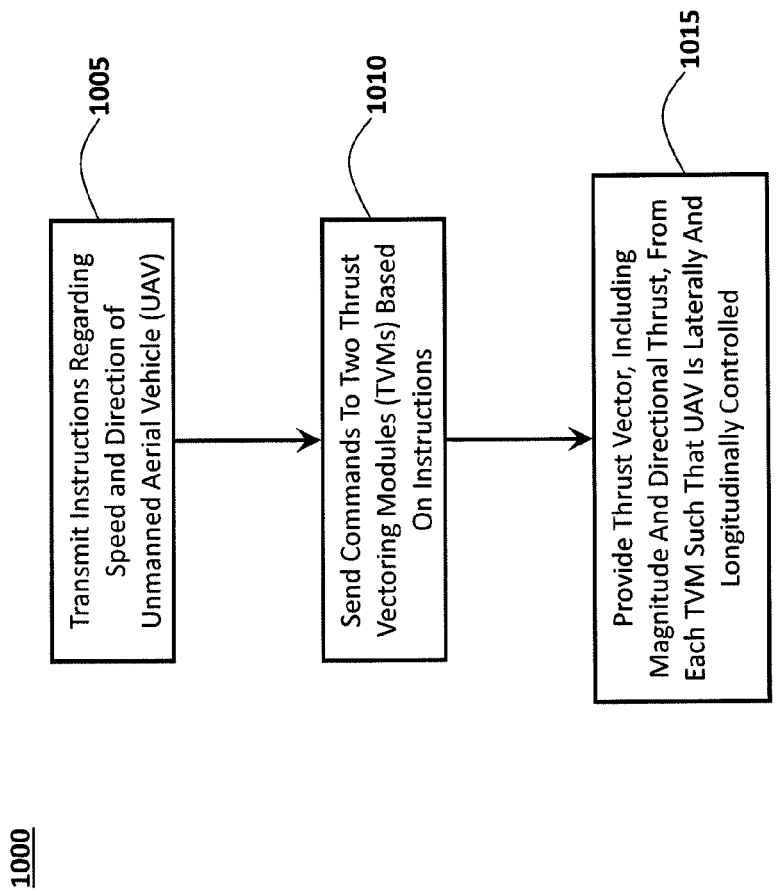
FIG. 10 illustrates a flow chart for a method of controlling a flight path of a modular miniature unmanned aircraft with vectored-thrust control.

Referring to FIG. 10, a flowchart 1000 illustrates a method for controlling a flight path of a UAV, such as a modular miniature unmanned aircraft with vectored-thrust control, according to a preferred embodiment of the invention. In the first step 1005, instructions for controlling the speed and direction of the modular miniature unmanned aircraft are transmitted by a user to the electronics module. In the second step 1010, the electronics module converts these instructions into commands which are sent to the two or more T/V modules. Finally, in the third step 1015, the T/V modules provide thrust in the appropriate directions and magnitudes to cause the modular miniature unmanned aircraft to change direction, thereby controlling the flight path of the modular miniature unmanned aircraft both laterally and longitudinally.

FIG. 11 illustrates a second modular miniature unmanned aircraft 1100 that operates in substantially the same manner as the miniature unmanned aircraft 100 and uses substantially identical T/V modules 106. As illustrated, the aircraft 1100 may utilize a blended wing-body configuration. Specifically, the removable electronics module 1104, which is akin to a fuselage, provides a smooth transition between the wing portion of the airframe 1102 and electronics module 1104.

Unlike the miniature unmanned aircraft 100, the second modular miniature unmanned aircraft 1100 employs an airframe 1102 having shallow pockets 1112, 1124, each providing an interface point for engagement with the T/V modules 106 and/or electronics module 1104. When assembled, the airframe 1102 and various interface points are configured to facilitate communication between the various modules, such as the T/V modules 106 and electronics module 1104. For example, an integrated wiring harness may be used. When an integrated wiring harness is desired, conductors for carrying data and power may be embedded, or run, within the airframe 1102 and configured to communicatively connect the interface points. The conductors may be run within hollow potions of the airframe 102 or embedded within the actual airframe material. For example, carbon nanotubes ("CNT") may be embedded within the airframe 102 material. Commonly owned U.S. patent application Ser. No. 13/561,598, filed Jul. 30, 2012, (incorporated herein by reference) discloses a suitable embedded CNT harness and method of doing the same.

Therefore, rather than employing exposed conductive cables 112 to send and receive electric current and electric signals as illustrated in FIG. 1, the T/V modules 106 may interface directly to the aerial vehicle 1100, whereby conductive cabling is integrated within the body of the airframe.

Accordingly, in addition to a physical interface for physically securing each module with the airframe 1102, each shallow pocket interface point 1112, 1124 may comprise an electrical interface for communicating signals or power between modules via the integrated wiring harness. According to this aspect, the aerial vehicle 1100 is more streamlined, thereby reducing drag and eliminating risk of having an exposed conductive cable 112 becoming entangled during operation.

To enable electrical interface functionality, each interface location 1112, 1126 of FIG. 12 may comprise one or more electrical contact pads 1130 and electrical contact pins 1128. The pins 1128 may reside on the aircraft's side (e.g., on the airframe 1102) and may be spring loaded to ensure contact. For example, the spring loaded pins 1128 may be located on the aircraft side. However, the spring loaded pins 1128 may also be located on the T/V module 106, or a combination thereof. Similarly, the pins 1128 located at the interface between wing and payload module 106 may be on the aircraft and/or payload pod side. Suitable spring loaded pins include Mill-Max Spring-Loaded ("Pogo Pin") Contacts. Mill-Max Spring Loaded Contacts are button type contacts interconnecting two parallel conductive surfaces inside an electronic device or instrument (e.g., between an aircraft surface and motor/payload module). The stroking movement of the spring pin piston accommodates uneven non-parallel conditions due to mechanical tolerances in the assembly. The contacts may be constructed out of gold-plated brass alloy components and a gold-plated spring.

The pads 1130 and contact pins 1128 allow for electrical power and signal transfer, while also allowing for easy attachment and removal of the T/V modules 106. In further embodiments, the electric power and signal transfer may be achieved using common electrical connectors, but may not preferred as it requires the end user to physically disconnect/connect the connector, resulting in an additional step by the operator to attach and remove the T/V modules 106.

As illustrated, when assembled, each T/V module 106 resides within a shallow pocket 1112 that provides anti-rotation bracket functionality, thus eliminating the need for a separate anti-rotational bracket. Specifically, the shallow pocket 1112 is used to resist thrust and torque loads, yet allows easy removal of the T/V modules 106 from the aerial vehicle. More specifically, the walls of the shallow pocket 1112 may secure the T/V modules 106 in two translational directions and one rotational direction. A passive retention device 1114 secures the T/V modules 106 in the other three degrees of freedom. In a preferred embodiment, the passive retention device 1114 comprises high-strength permanent magnets, such as high-strength neodymium magnets. The electronics module 1004 may be similarly attached to the airframe 1002 and resides within the shallow pocket 1124. Akin to the T/V module 106, the electronics module 1004 electrically couples with the airframe 1002 via interface location 1126.

Figure 12A:
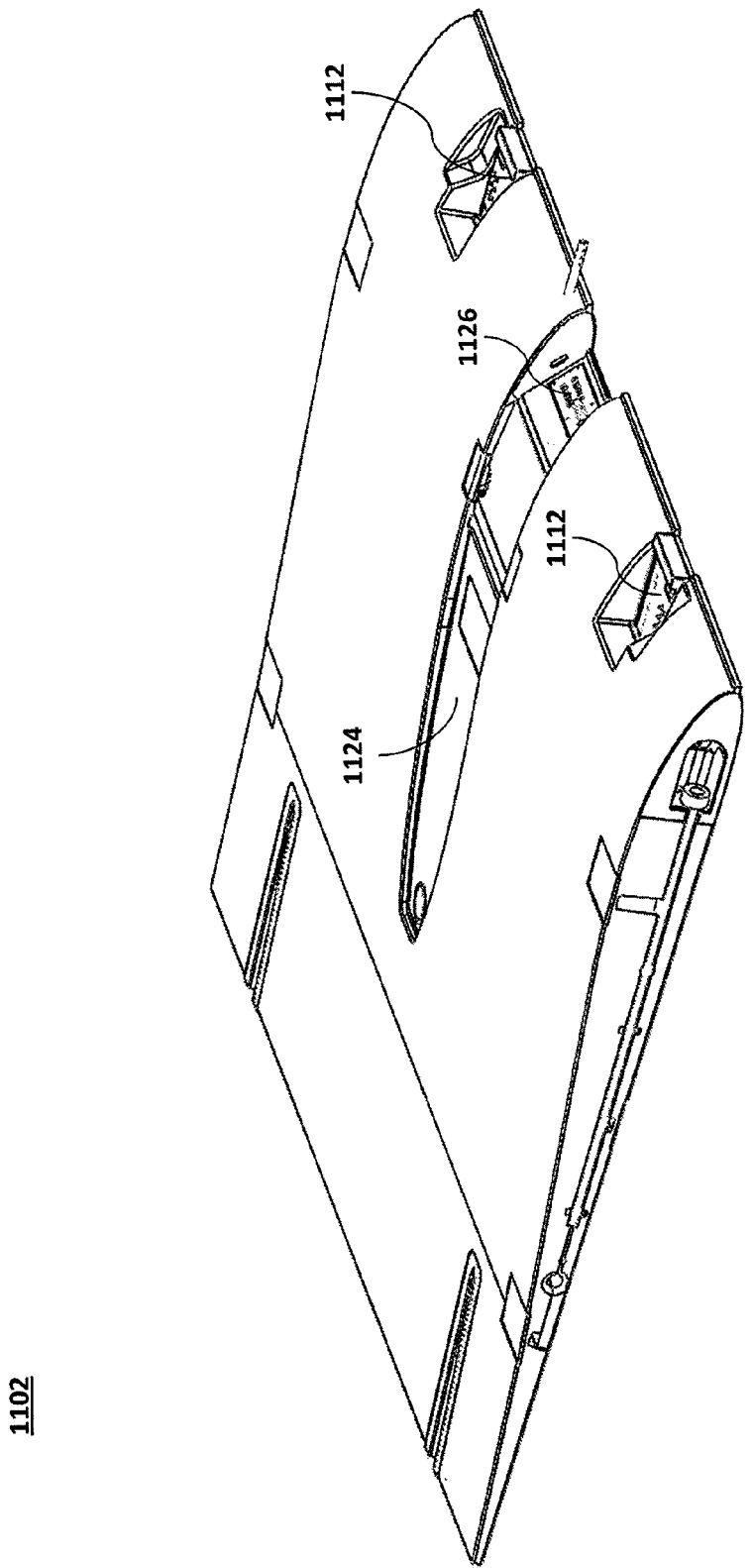
FIGS. 12a and 12b illustrate an airframe for a modular miniature unmanned aircraft.
Figure 12B:
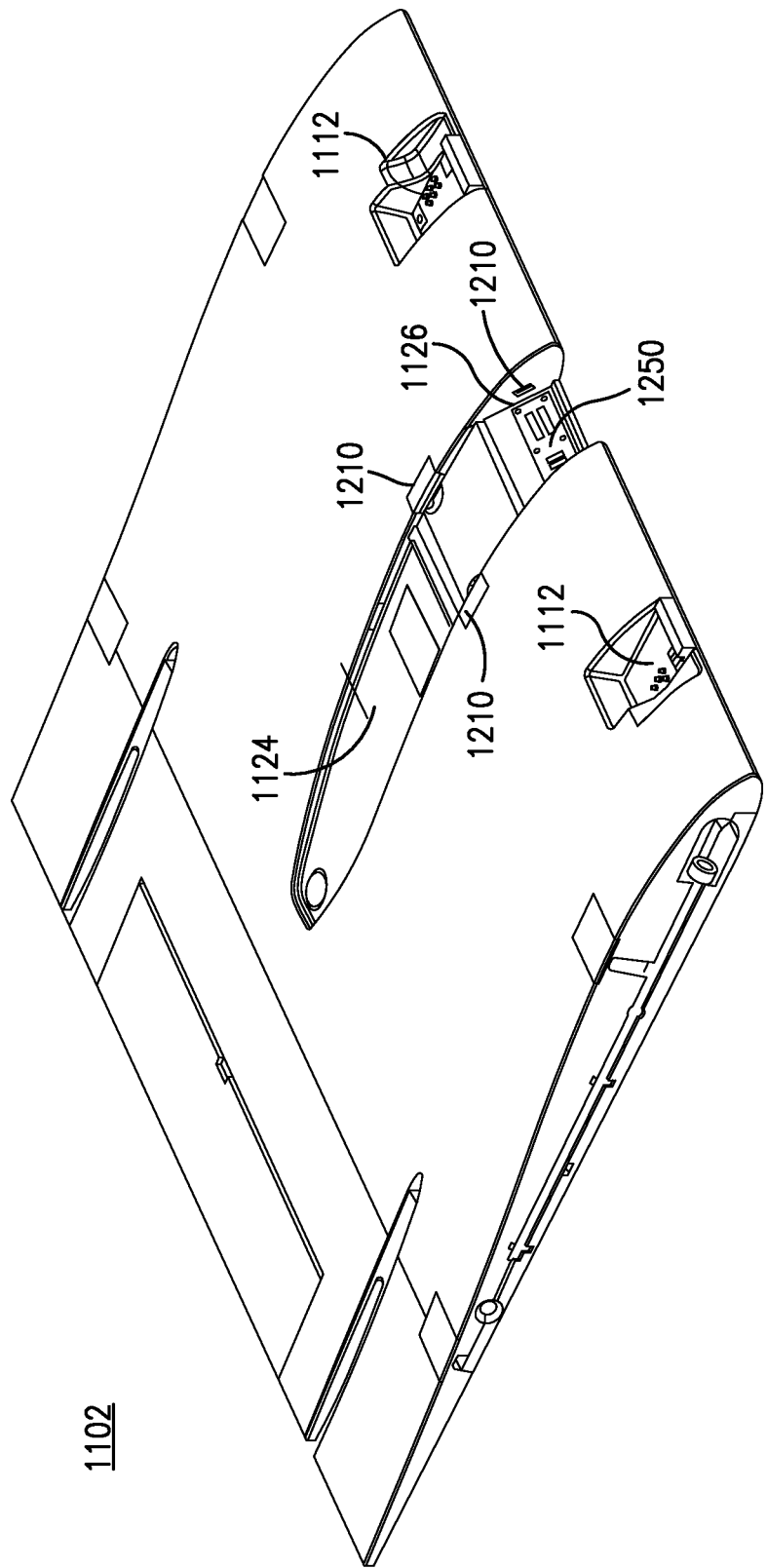
Figure 12C:
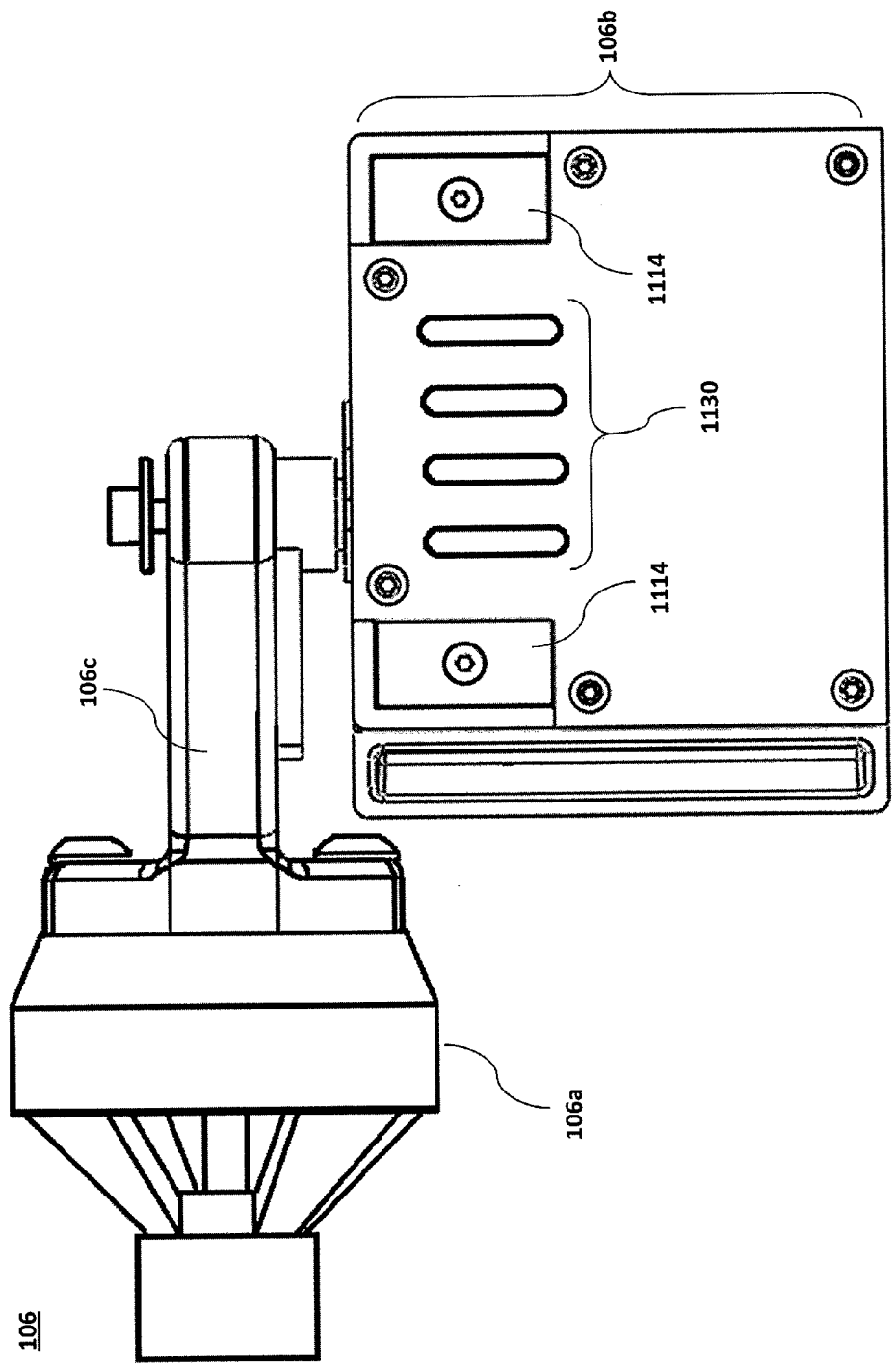
FIG. 12c illustrates the underside of a T/V module for use with the airframe component of FIGS. 12a and 12b.
Figure 12D:
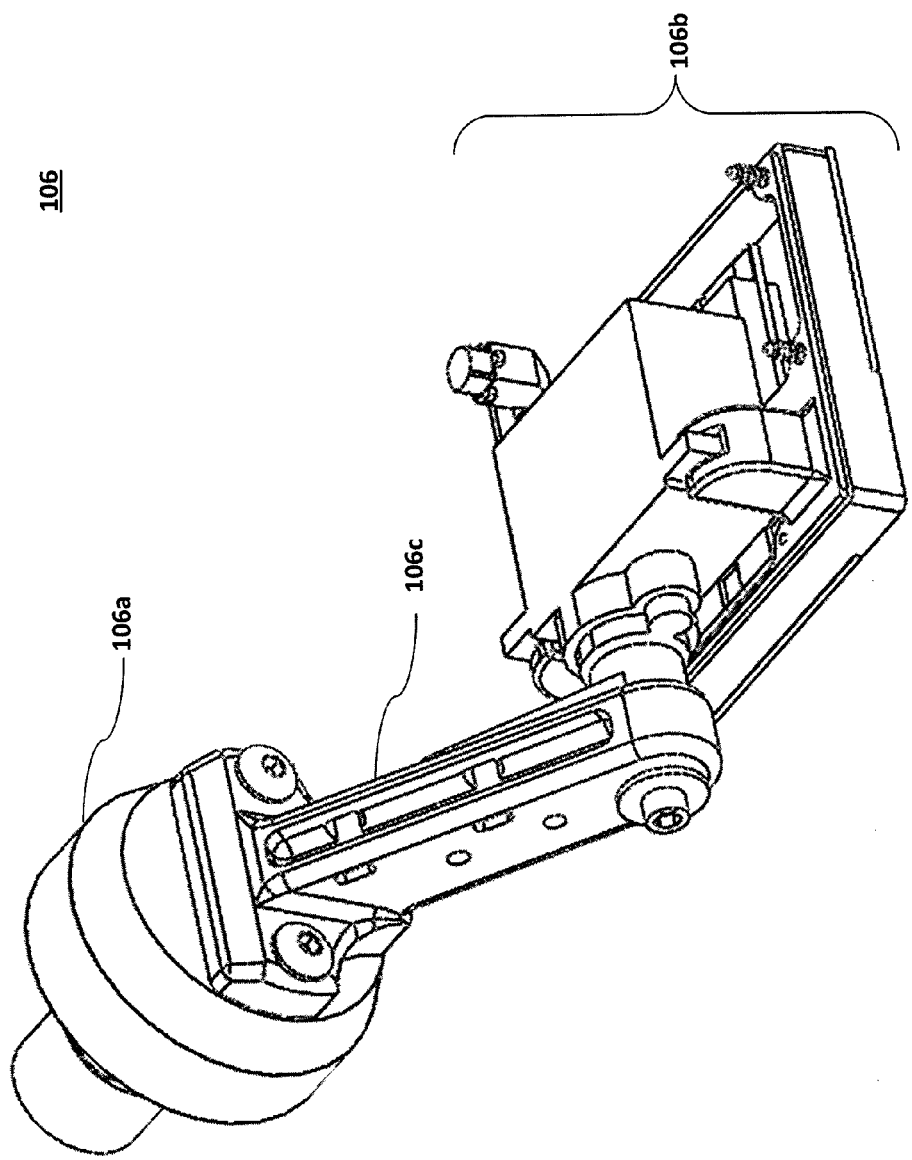
FIG. 12d illustrates a rear prospective view of the T/V module of FIG. 12c.
Figure 12E:
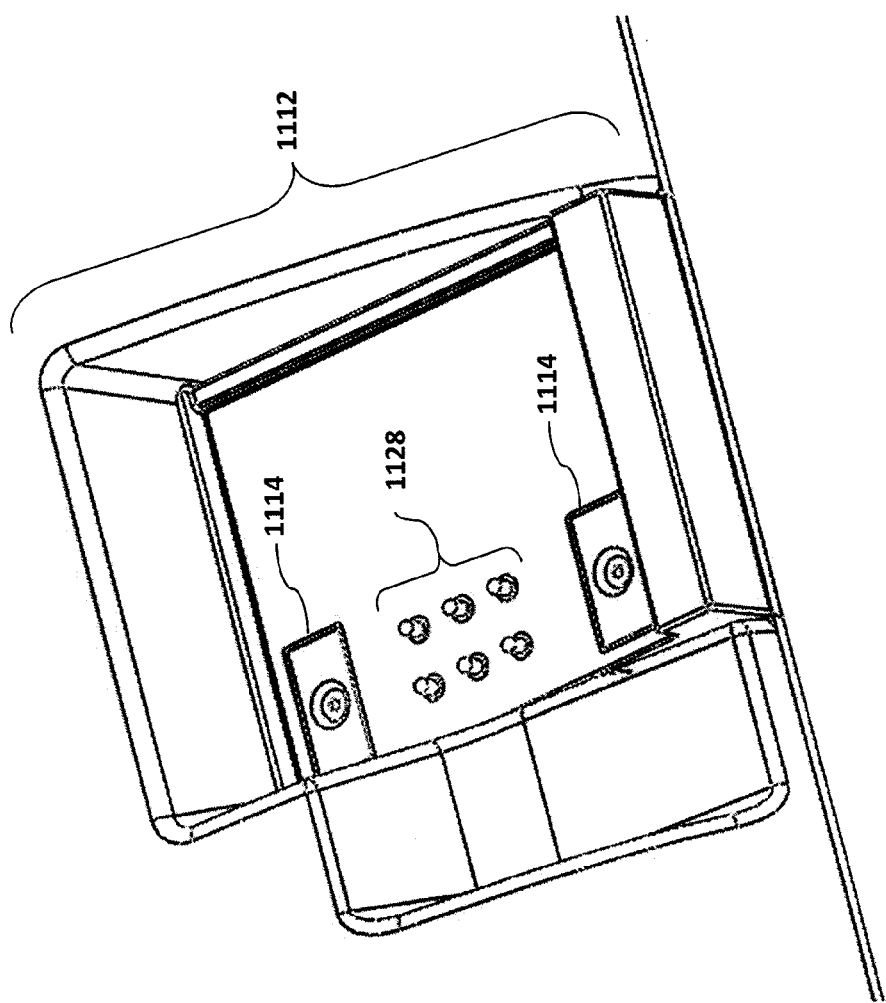
FIG. 12e illustrates a enlarged view of the shallow pocket of FIGS. 12a and 12b.

FIG. 12c provides an underside view of a T/V module 106 configured for attachment to the airframe 1102 and FIG. 12e illustrates a corresponding shallow pocket 1112. As illustrated, the underside of the servo mechanism 106b, which serves as the T/V module's 106 base portion, may be equipped with one or more magnets 1114 for coupling with magnets positioned in the shallow pocket 1112 of the airframe 1102 and connection pads 1130. The connection pads 1130 enabled the T/V module 106 to electrically interface with other modules via the integrated wiring harness running throughout the airframe 1102 and pins 1128.

Like the magnets on the airframe 1102, the magnets 1114 on the servo mechanism 106b may also be high-strength neodymium magnets. Specifically, as illustrated, the magnets may be positioned within two corners of the shallow pocket 1112 while two additional magnets 1114, of opposite polarity, are positioned in the respective corners of the T/V module 106. The retention force of the mated magnets secures the T/V module 106 in the remaining two rotational directions and the one translational direction. This retention configuration allows for passive retention, wherein the end user is not required to activate, deactivate, or otherwise disable any mechanism to remove the T/V module 106 from the airframe 1002.

When magnets are used, removal of the T/V module 106 only requires that the end user apply a reasonable force to pull or rock the T/V module 106 from its shallow pocket 1112. This same force acts upon the T/V module 106 during impact, whereby the T/V module 106 passively ejects from the airframe 1102 during impact. Without ejecting, a significant portion of the entire vehicle's landing loads would have to travel through the T/V module 106, resulting in undesirable damage to the T/V module 106. As such, ejection serves to protect the mechanical components of the T/V module 106 from damage.

All components of the T/V module 106 (with the possible exception of the propeller 114, motor 106a, and rigid link 106c) may be secured and housed together in a chassis or "pod." The T/V module 106 propellers 114 may be easily attached and removed from the motor 106c for ground transportation or storage. Finally, FIG. 12d provides a rear prospective view of the T/V module 106.

Figure 13A:
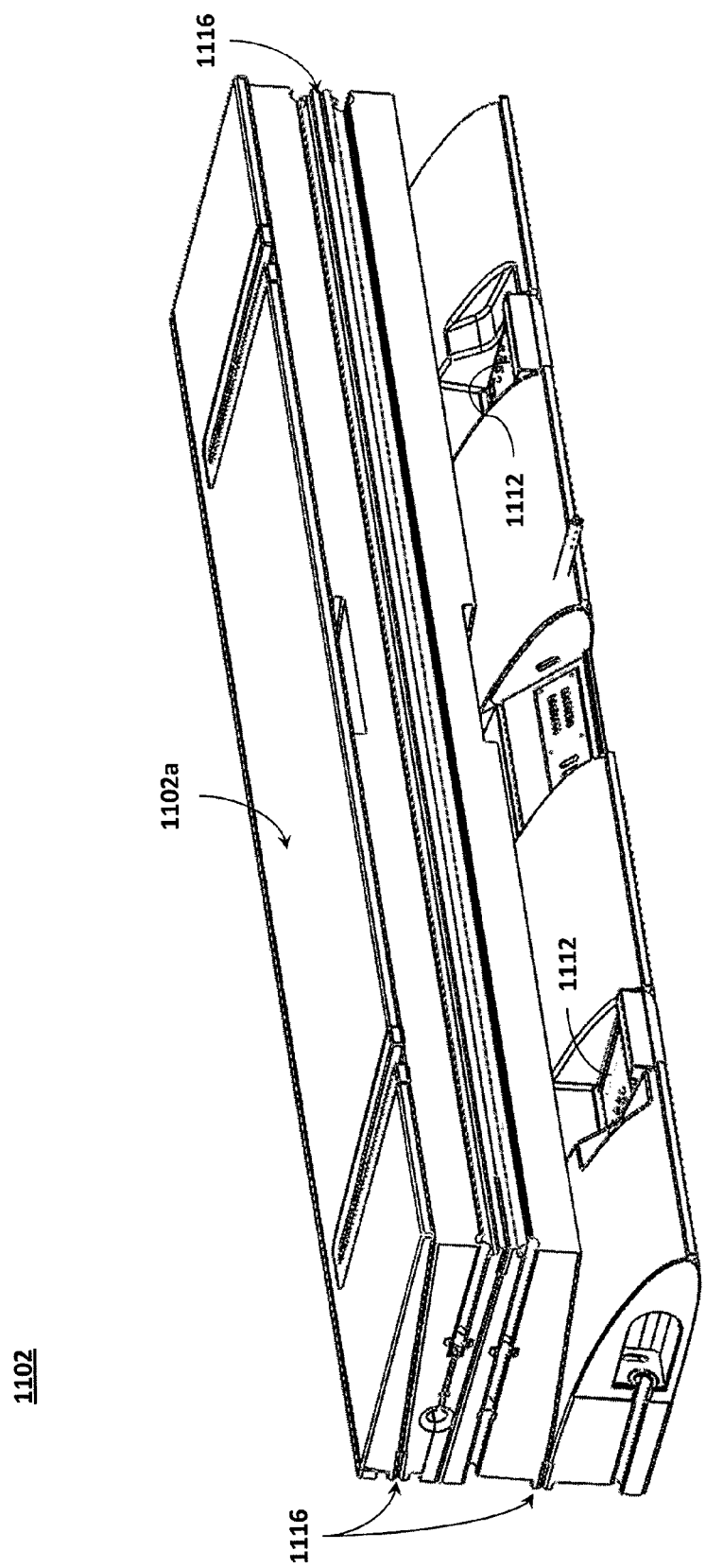
FIGS. 13a, 13b, and 13c illustrate a first folding airframe configuration of the airframe component of FIGS. 12a and 12b.
Figure 13B:
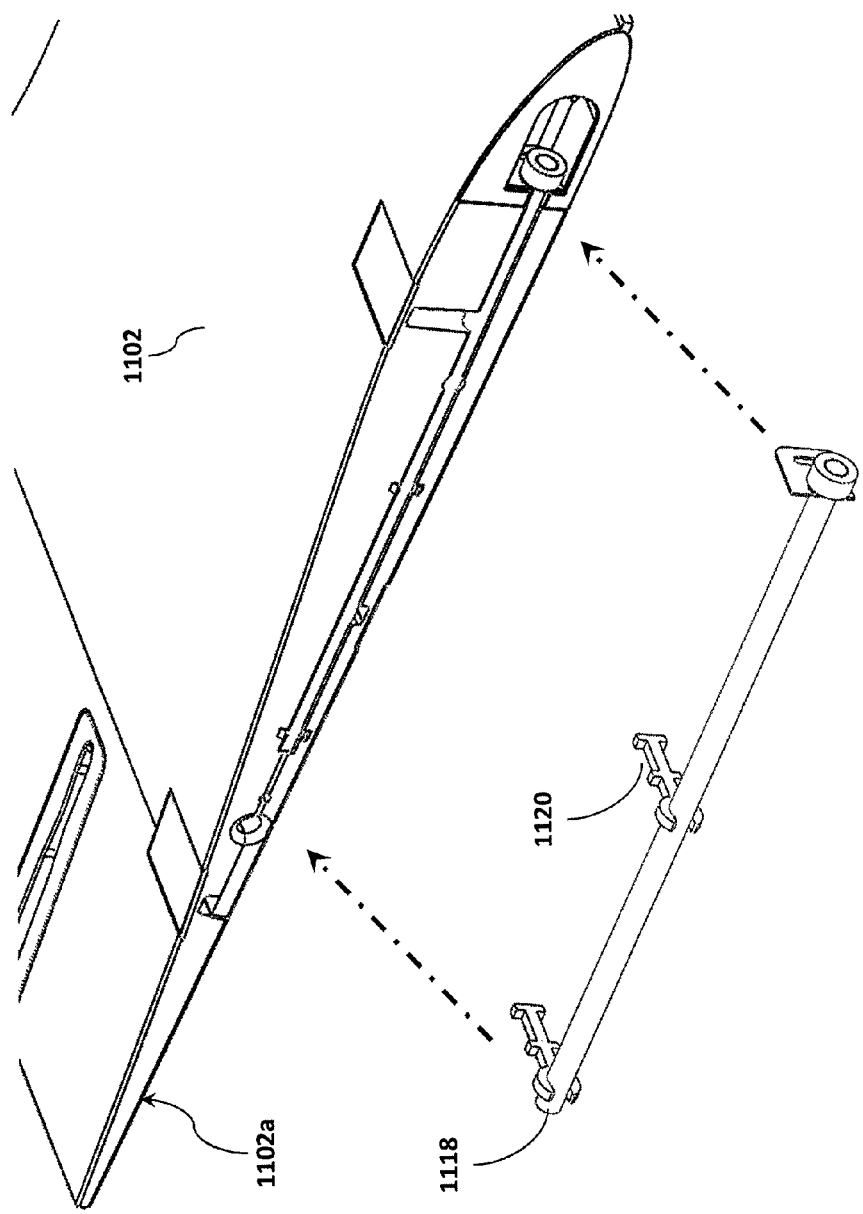
Figure 13C:
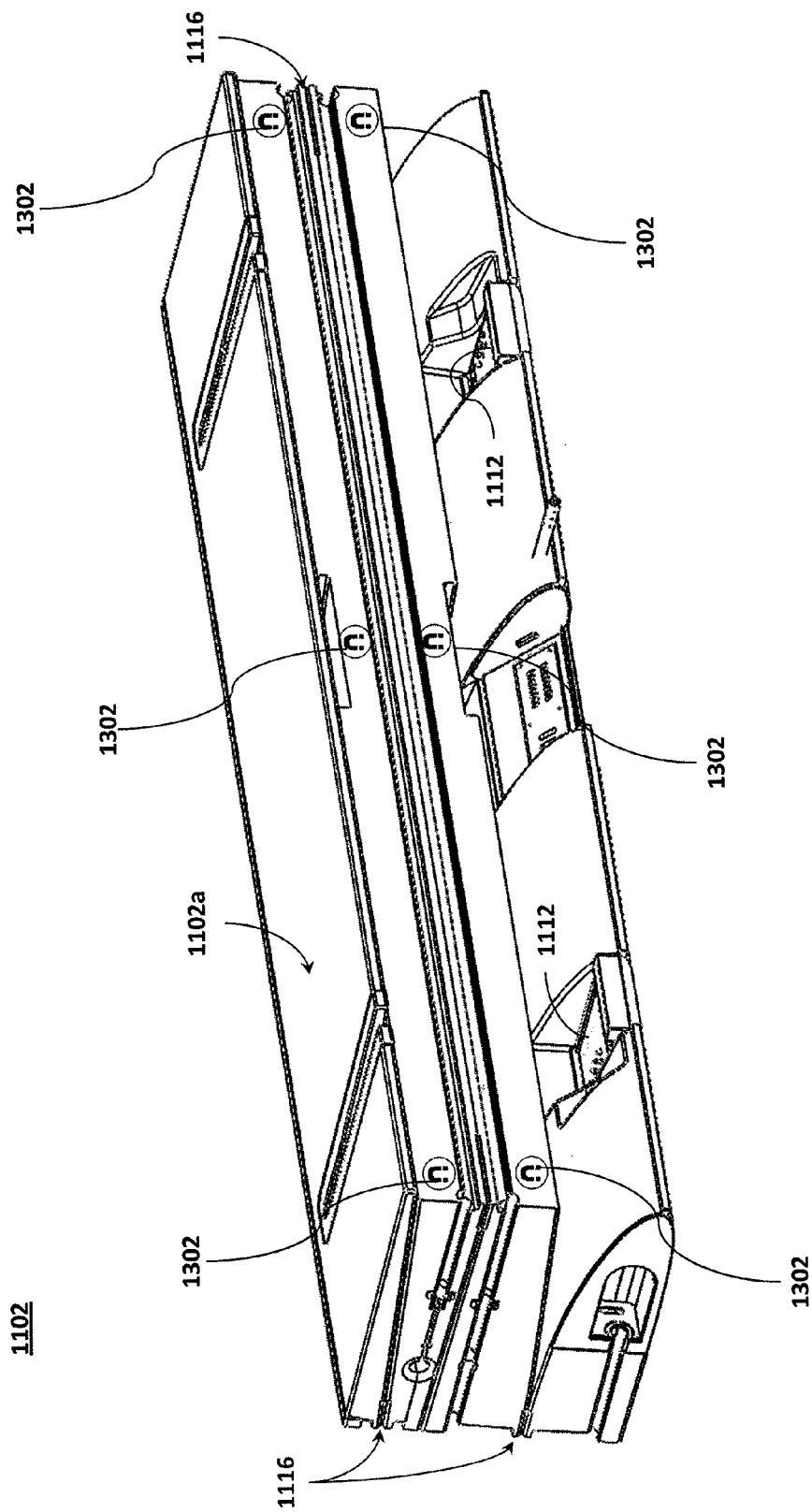

As illustrated in FIGS. 13a through 13c, a folding airframe configuration may be employed to reduce the stowed footprint of the aircraft 1100 while minimizing the reduced structural strength inherent to adding fold lines to an airframe 1102. Accordingly, as illustrated in FIG. 13a, the airframe 1102 may be provided with three different fold lines 1116 that split the airframe's 1102 chord into four substantially equal-length sections. The last of the sections 1102a, the section most aft, may be utilized as a trim tab that trims the pitching moment of the aircraft 1100. This section 1102a should have a desired reflection angle, which may be retained by installing fins 1108, and does not change during the flight duration. However, in certain aspects, the angle may be actively controlled during flight with, for example, an adjustment mechanism within airframe 1102, such as a servo or piezoelectric element.

The airframe 1102 in its deployed configuration is ideally substantially rigid, with minimal mechanical compliance. Such rigidity may be accomplished by having two rods 1118 fixed to the edges of the airframe 1102 (e.g., one on each side). The rods 1118 may clip into the edge of the airframe 1102. When not in use, the rods 1118 may be stored within the airframe 1102 itself. The clips 1120 are passive and provide a connection that has sufficient levels of compliance when the airframe 1102 is loaded in flight. In lieu of physical clips, the rods 1118 may be secured to the airframe 1102 via one or more magnets. In certain aspects, the two rods 1118 may be attached to each other by an elastic cord that runs through the inner diameter of the rods 1118 and through the airframe 1102 itself. The elastic cord may serve two purposes, to provide a tether between the rods 1118 and airframe 1102, and to prevent the rods 1118 from moving forward or aft in their deployed configuration.

With respect to FIG. 13c, in addition to, or in lieu of the rods 1118, one or more magnets 1302 may be provided at each fold line 1116 (e.g., magnets of opposite polarity may be positioned on each side of the hinge) such that the magnets 1302 engaged with one another when the airframe 1102 sections are secured in a deployed position. To fold the airframe 1102 (e.g., for stowage), the operator may simply fold the aircraft at each fold line 1116 with sufficient force to overcome the magnet's 1302 strength. The magnets 1302 may be the same as, or similar to, the high power magnets used to secure the T/V modules 106 to the airframe 1102.

Figure 14:
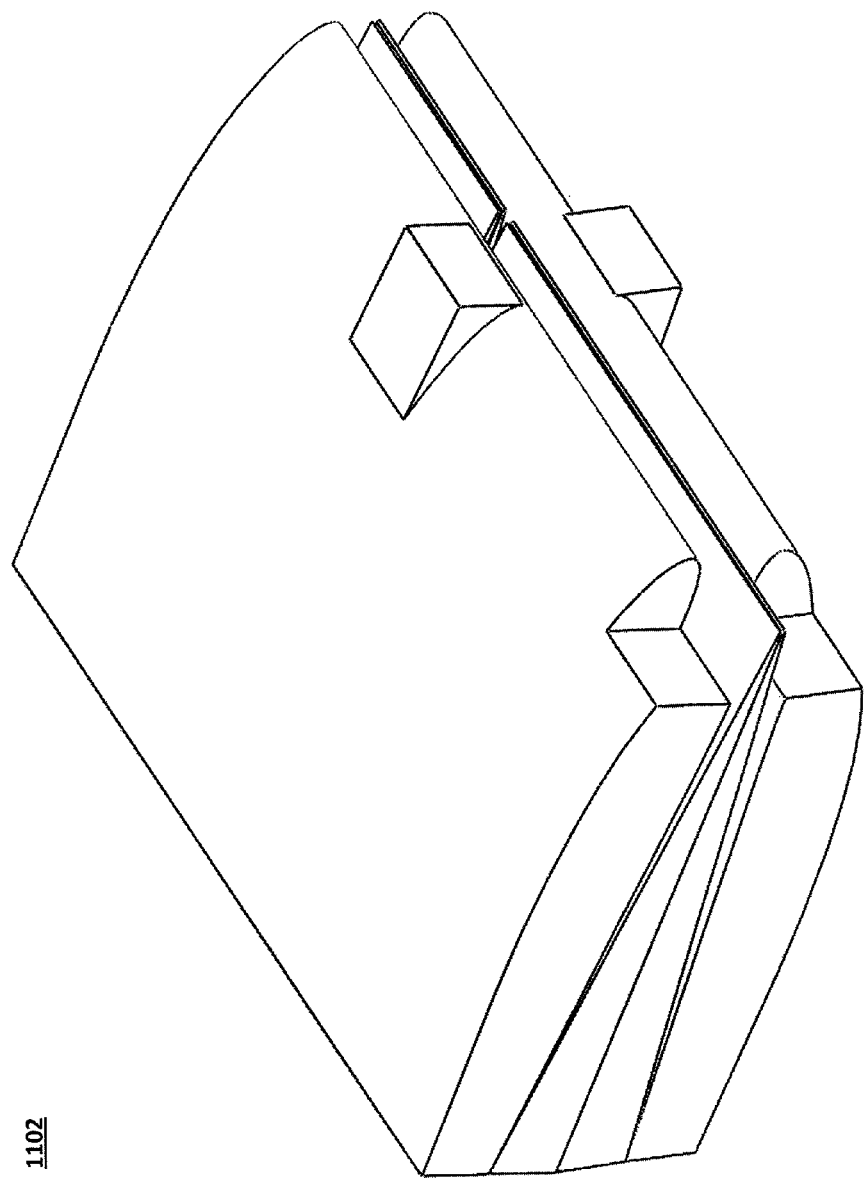
FIG. 14 illustrates a second folding airframe configuration of the airframe component of FIGS. 12a and 12b.
Figure 15A:
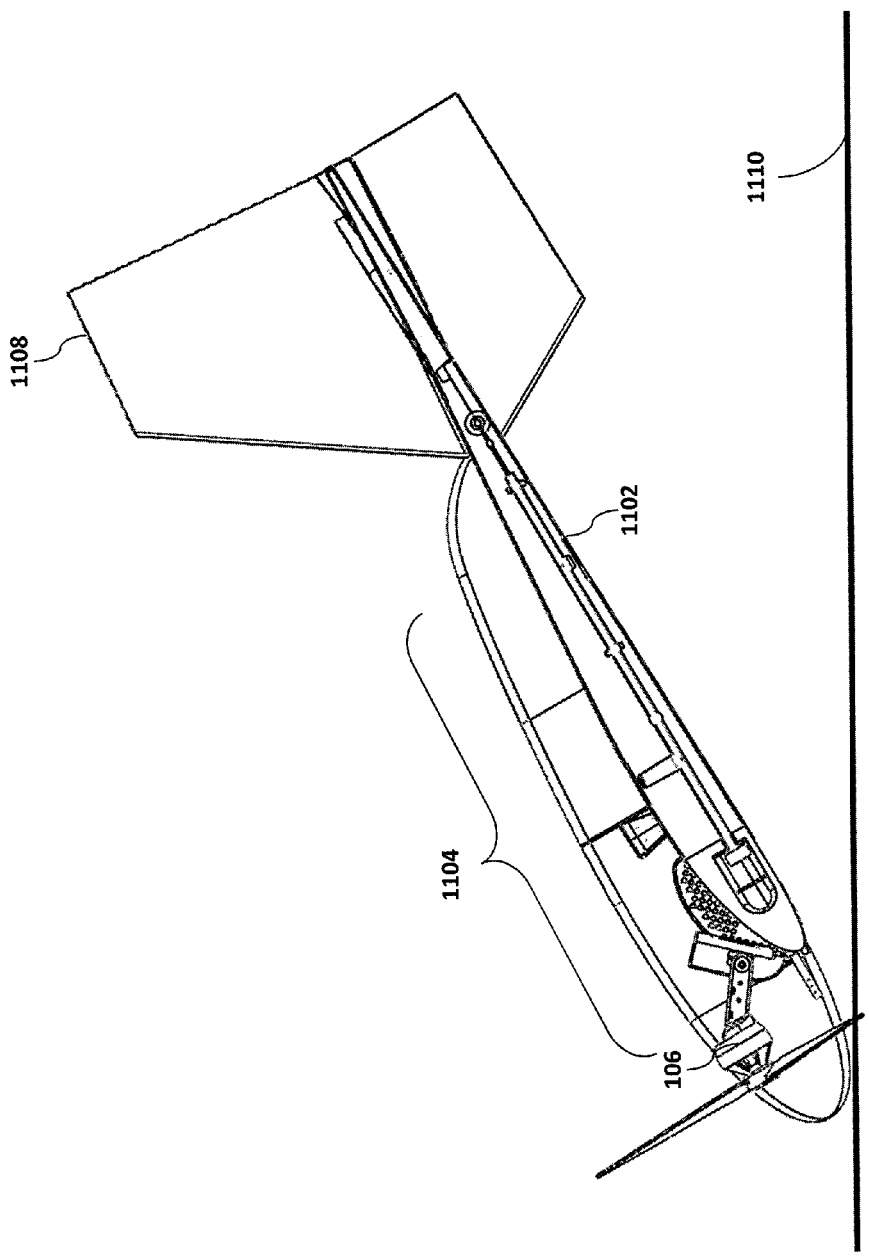
FIGS. 15a through 15d illustrate a modular miniature unmanned aircraft having frangible aircraft components ejected during four phases of ground impact.
Figure 15B:
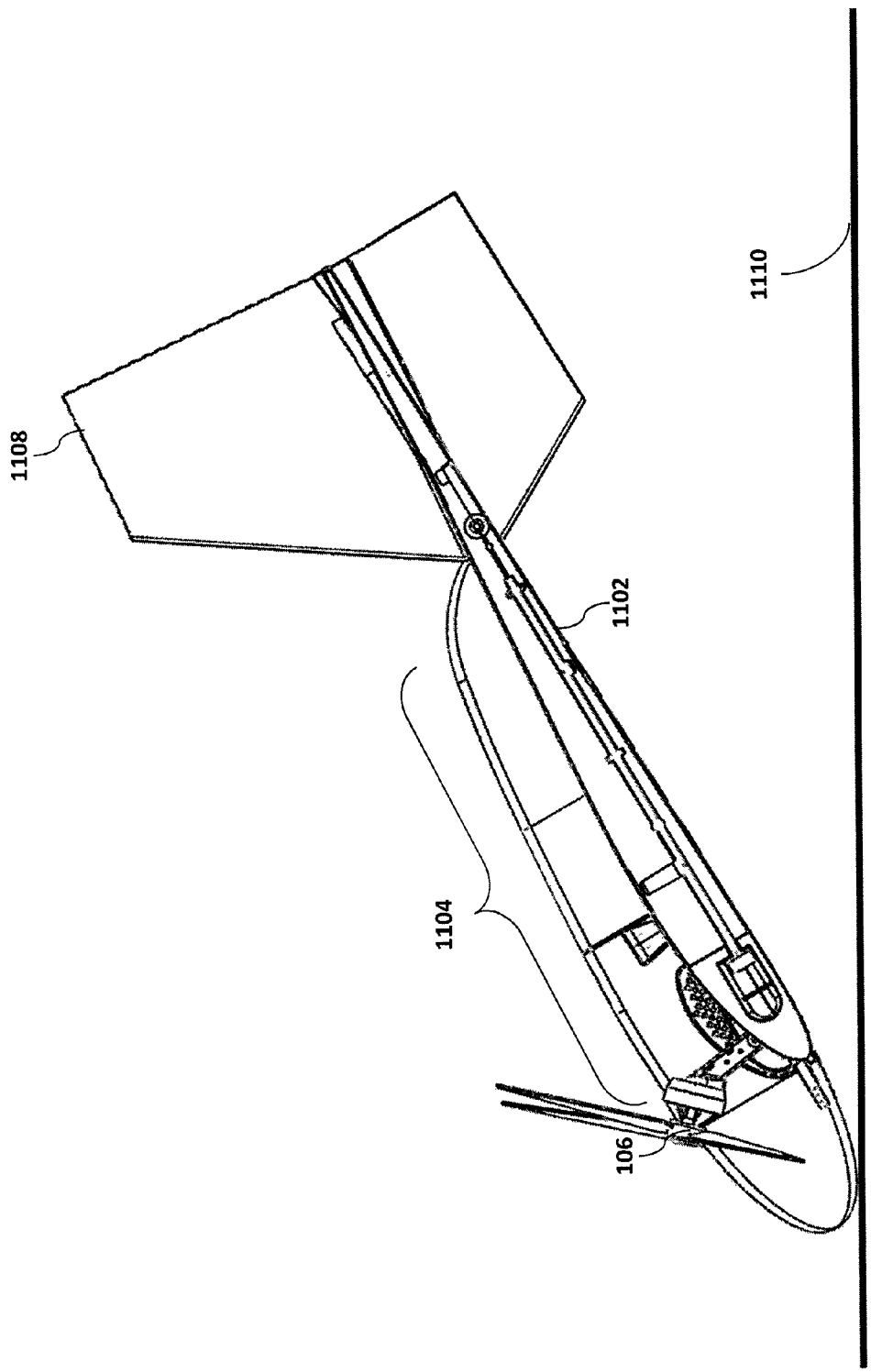
Figure 15C:
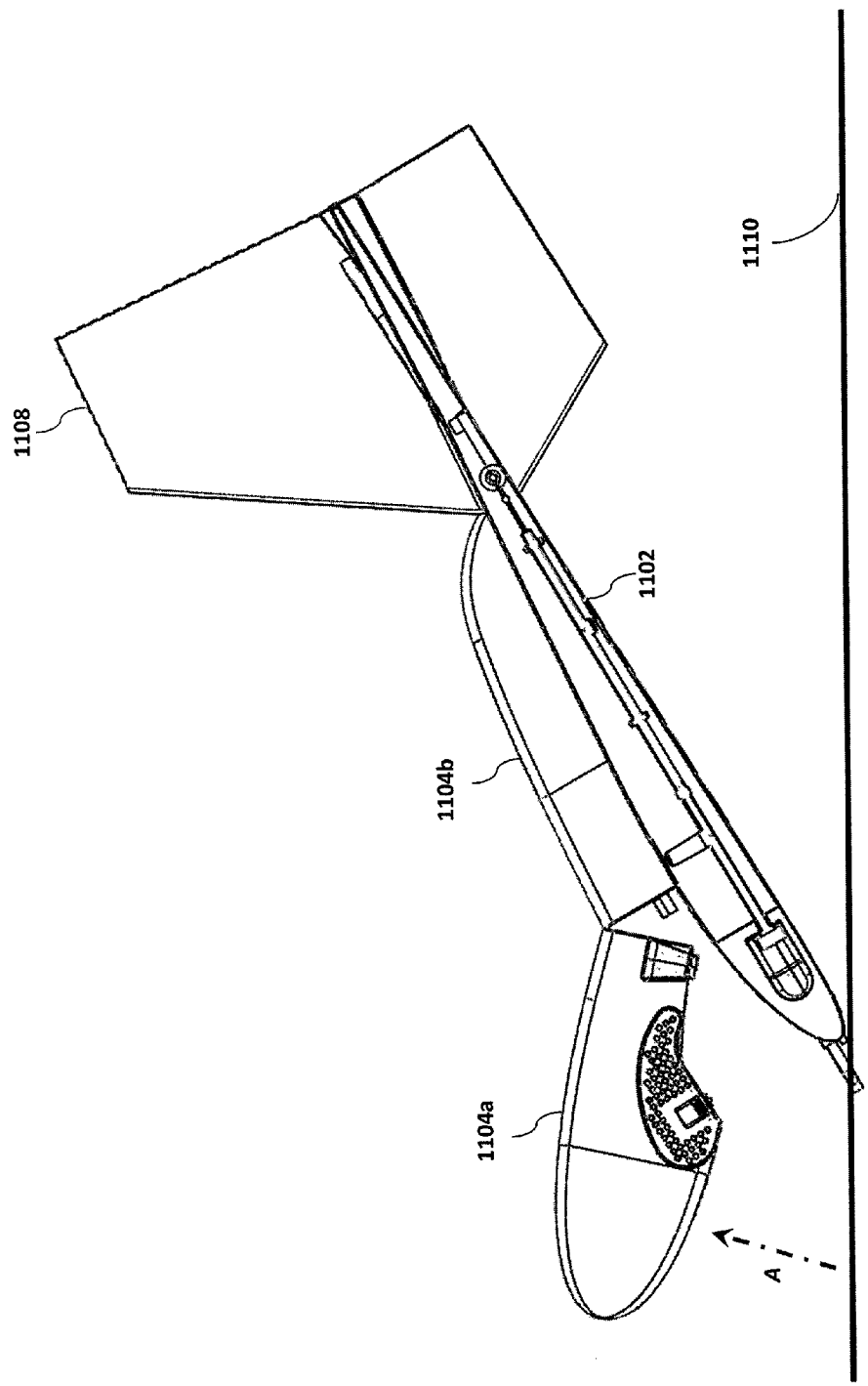
Figure 15D:
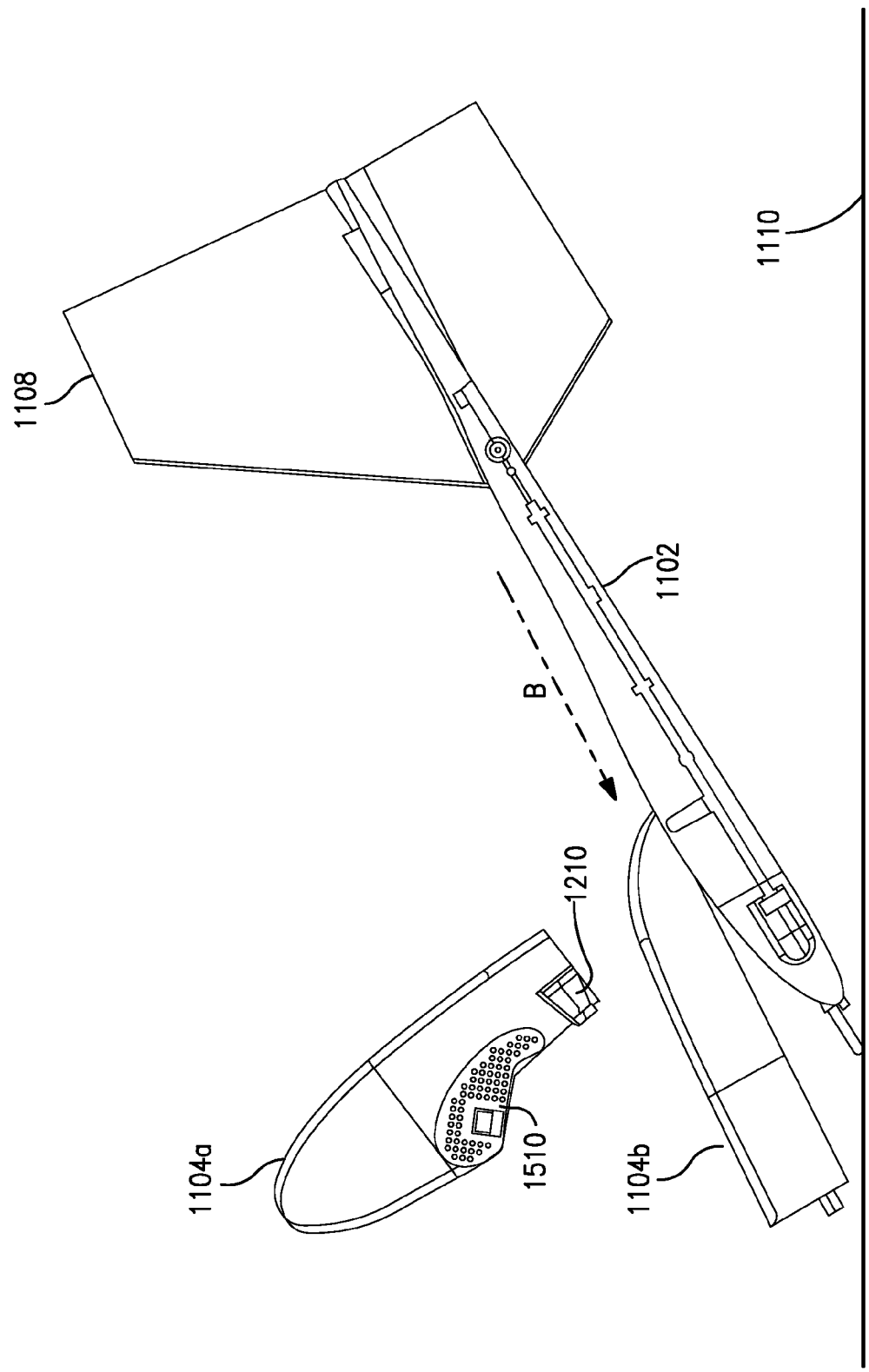

Depending on the stowage needs, the airframe 1102 may be configured to fold into quarters as illustrated in FIG. 14, rather then lengthwise. The folding scheme may include two integrated hinges: a chord-wise hinge and a centerline hinge. Rigidity of the airframe 1102 in the deployed position may be accomplished using the rods 1118 or magnets, as discussed above, and/or the electronics module 1108.

In operation, the modular miniature unmanned aircraft 1100 may employ a deep-stall, high-glide angle approach for landing. A benefit of which over a conventional landing approach is a reduced runway length requirement, the disadvantage of which is a relatively high-landing impact load. However, two approaches may be taken to avoid damage to the aircraft's structure during a deep-stall landing.

The first approach is to increase the strength of the structure, typically achieved by increasing the size of the structure and strength of material. The other approach is to reduce the peak impact load. The former solution is generally undesirable because it requires substantial weight and cost to be added to the aircraft. Like any aircraft, the modular miniature unmanned aircraft's 1100 performance may be significantly hindered by the addition of weight. The aircraft weight can range from about 800 g to 1100 g with various sized payloads. Fortunately, as will be discussed below, the latter solution may be achieved through several means.

For example, peak impact loads may be reduced by designing the major components of the aircraft to be frangible. In other words, the major components may be configured to eject from the main aircraft structure during an impact. Accordingly, instead of being absorbed as strain energy by the aircraft's structure, the landing or impact energy is transferred into kinetic energy of the frangible components. For example, as noted above and illustrated in FIGS. 15a through 15*d*, the T/V module 106 and electronics module 1104 may detach and eject from the main aircraft structure (e.g., the airframe 1102) during an impact, thereby mitigating potential damage to the components. Moreover, as illustrated in FIG. 15 *c*, the electronics module 1004 may comprise two sub-modules, such as a payload sub-module 1104*a* and a battery sub-module 1104*b*. The highly dense, heavy components of the aircraft 1100 (e.g. the battery 1104*b*) may be designed to eject in a direction that minimizes contact with the less dense, more frangible components (e.g., the payload 1104*a*).

The controlled ejection of the frangible components may be accomplished by designing the manner in which the components mechanically interface with each other and with the aircraft structure (e.g., the airframe 1102). For example, the ejection of the payload 1104*a* and battery module 1104*b* may be controlled. More specifically, the payload 1104*a* may make use of a plurality of passive engagement tabs (e.g., four, two on each side of the payload 1104*a*) and a ramp interface between the airframe 1102 and the payload 1104*a* The ramp interface may be approximately 45 degrees to the typical impact load direction. As such, the impact load when transferred from the payload board to the aircraft frame is results in a portion of that load separating the payload pod from the aircraft frame. The passive engagement tabs provide the retention force. By simply overcoming this retention force, which is accomplished by an impact, the engagement tabs disengage.

In a typical ground impact position, the payload module's 1104*a* nose is the first component to touch the ground 1110. This introduces a force at the ramp interface between the payload 1104*a* and the airframe 1102. This force pushes the payload module 1104*a* away from the airframe 1102 in direction A, ultimately disengaging the passive retention tabs. With the payload module 1104*a* removed, the aircraft 1100 and remaining battery 1104*b* have only lost a portion of their forward velocity. Soon after hitting the ground 1110, the aircraft structure, as well as the battery module 1104*b*, continues forward and hits the ground 1110 with no portion of the aircraft 1100 between the ground 1110 and the battery module 1104*b*, thus avoiding damage to the payload module 1104*a* by the heavy battery module 1104*b*. Similarly, the T/V modules detach and eject from the airframe 1102 upon impact with the ground 1110, thus mitigating damage to both the payload 1104*a* and T/V modules 106.

Although the present invention has been described with respect to what are currently considered to be the preferred embodiments, the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, all brochures, and all other published documents discussed above are hereby incorporated by reference into the Detailed Description of the Preferred Embodiment.

What is claimed is:

1. A thrust-vectoring module for providing propulsion forces to an aerial vehicle, the thrust-vectoring module comprising:
   a propeller;
   an electric motor, wherein the electric motor is configured to rotate the propeller;
   a rigid link having a first end and a second end, wherein the first end is coupled with the electric motor;
   a positioning device coupled with the second end of the rigid link, wherein the positioning device is configured to position the electric motor by rotating the rigid link; and
   a retention mechanism for passively securing the thrust-vectoring module to the aerial vehicle, wherein said retention mechanism comprises a permanent magnet.

2. The thrust-vectoring module of claim 1, wherein the thrust-vectoring module is configured to passively break away from the aerial vehicle upon sudden impact.

3. The thrust-vectoring module of claim 1, wherein the positioning device is configured to position the electric motor by rotating the rigid link about at least one degree of freedom.

4. The thrust-vectoring module of claim 1, wherein the electric motor's rotational speed is controlled to produce a desired amount of thrust.

5. The thrust-vectoring module of claim 1, wherein the positioning device comprises an electric servo.

6. The thrust-vectoring module of claim 1, wherein the permanent magnet is a neodymium magnet.

7. The thrust-vectoring module of claim 1, wherein the thrust-vectoring module is electrically coupled with the aerial vehicle via an electrical interface.

8. An airframe system, the airframe system comprising:
   a thrust-vectoring module, said thrust-vectoring module comprising (i) a propeller, (ii) an electric motor configured to rotate the propeller to generate a thrust vector, and (iii) a positioning device configured to direct the thrust vector by adjusting the electric motor's position;
   an airframe, said airframe having an interface location configured to engage said thrust-vectoring module; and
   a retention mechanism for passively securing said thrust-vectoring module to said airframe at said interface location, wherein said retention mechanism comprises a permanent magnet.

9. The airframe system of claim 8, wherein said interface location is a shallow pocket configured to receive at least a portion of said thrust-vectoring module.

10. The airframe system of claim 9, wherein said shallow pocket is correspondingly shaped to said portion of said thrust-vectoring module.

11. The airframe system of claim 8, wherein the thrust-vectoring module is configured to passively break away from the airframe upon sudden impact.

12. The airframe system of claim 8, wherein the positioning device comprises an electric servo.

13. The airframe system of claim 8, wherein the thrust-vectoring module is electrically coupled with the airframe via an electrical interface at said interface location.

14. The airframe system of claim 8, wherein the airframe comprises an integrated hinge to facilitate folding of the airframe.

15. An aerial vehicle, the aerial vehicle comprising:
   an airframe;
   a thrust-vectoring module, said thrust-vectoring module comprising (i) a propeller, (ii) an electric motor configured to rotate the propeller to generate a thrust vector, and (iii) a positioning device configured to direct the thrust vector by adjusting the position of the electric motor; and
   a retention mechanism for passively securing the thrust-vectoring module to said airframe, wherein said retention mechanism comprises a permanent magnet.

16. The aerial vehicle of claim 15, wherein the thrust-vectoring module is configured to passively break away from the airframe upon sudden impact.

17. The aerial vehicle of claim 15, wherein the positioning device comprises an electric servo.

18. The aerial vehicle of claim 15, wherein the permanent magnet is a neodymium magnet.

19. The aerial vehicle of claim 15, wherein the thrust-vectoring module is electrically coupled with the airframe via an electrical interface.

20. The aerial vehicle of claim 15, wherein the electric motor's rotational speed is controlled to produce a thrust vector having a desired magnitude.

\* \* \* \* \*